United States Patent
Regie et al.

(10) Patent No.: US 8,481,837 B2
(45) Date of Patent: Jul. 9, 2013

(54) DEVICE FOR PROVIDING AND ANALYZING MUSICAL DATA

(75) Inventors: Jean-Francois Regie, Fuveau (FR); Daniel Roubaud, Fuveau (FR)

(73) Assignee: Daniel Roubaud, Fuveau (FR)

( * ) Notice: Subject to any disclaimer, the term of this patent is extended or adjusted under 35 U.S.C. 154(b) by 214 days.

(21) Appl. No.: 13/060,808

(22) PCT Filed: Aug. 27, 2009

(86) PCT No.: PCT/FR2009/051636
§ 371 (c)(1),
(2), (4) Date: Feb. 25, 2011

(87) PCT Pub. No.: WO2010/026333
PCT Pub. Date: Mar. 11, 2010

(65) Prior Publication Data
US 2011/0154976 A1   Jun. 30, 2011

(30) Foreign Application Priority Data
Sep. 5, 2008   (FR) ..................... 08 55965

(51) Int. Cl.
*G09B 15/02* (2006.01)
(52) U.S. Cl.
USPC ........................................ 84/470 R

(58) Field of Classification Search
USPC ................................................ 84/470 R, 473
See application file for complete search history.

(56) References Cited

U.S. PATENT DOCUMENTS

| 2,502,300 | A | * | 3/1950 | Young | 84/473 |
|---|---|---|---|---|---|
| 3,592,099 | A | * | 7/1971 | Gibby | 84/473 |
| 3,671,661 | A | * | 6/1972 | El Yoshida | 84/473 |
| 3,949,640 | A |   | 4/1976 | Cournoyer | |
| 4,602,550 | A | * | 7/1986 | Dadi et al. | 84/473 |
| 6,323,410 | B1 | * | 11/2001 | Rackow | 84/470 R |

FOREIGN PATENT DOCUMENTS
NL          87411          2/1958

* cited by examiner

*Primary Examiner* — Jianchun Qin
(74) *Attorney, Agent, or Firm* — Ladas & Parry, LLP

(57) ABSTRACT

A device includes a rectangular base A engaging with two cursors B and C, the base and the cursors having musical data thereon that relate to notes, scales, tonalities, intervals and chords, and that analytically provides said data with regard to the fundamental rules of harmony. The rectangular base A includes a central longitudinal slot in which the first cursor B slides and the second cursor C slides over the base A and the first cursor B. The device is suitable for use by musicians in general and, more particularly, for instructional use.

10 Claims, 9 Drawing Sheets

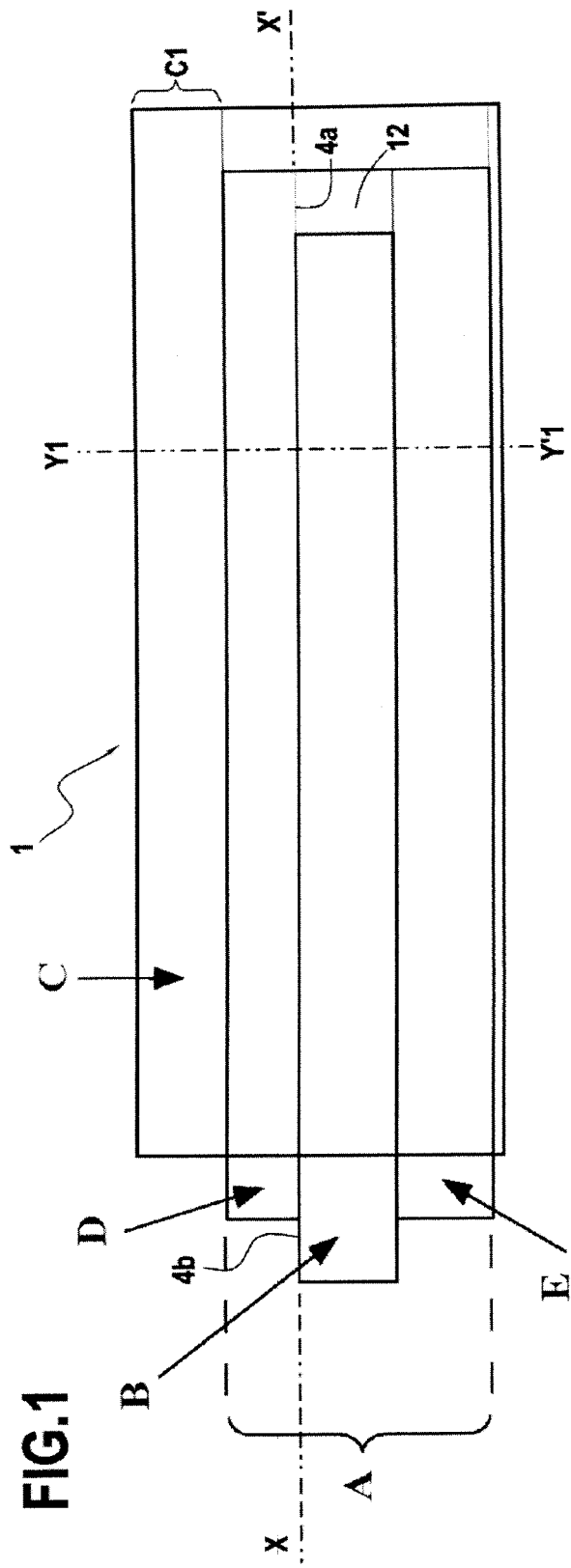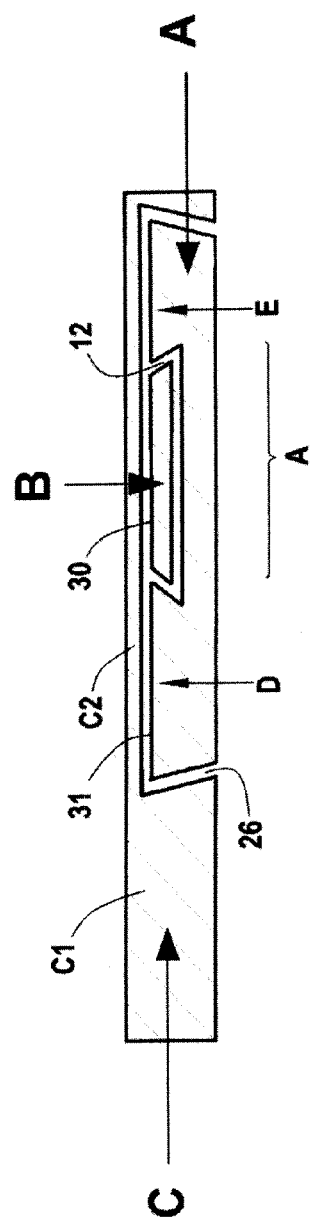

DEVICE FOR PROVIDING AND ANALYZING MUSICAL DATA

The present invention relates to a device of the slide rule type for providing and analyzing musical data for the purposes of indicating, teaching and analyzing musical data relative to the fundamental rules of harmony.

This device is suitable for use by musicians in general and is more particularly suitable for pedagogical use.

BACKGROUND OF THE INVENTION

There are many devices for providing musical data.

These devices are generally limited to providing relatively incomplete musical data taken in isolation without information as to their compatible or coherent harmonic context, i.e. respect for the fundamental rules of harmony, such as sequences compatible with the fundamental rules of harmony. The rules of harmony are principally the rules governing the sequence of notes or chords, i.e. the data concerning the notes or chords that precede or follow a given note or chord in a manner considered musically compatible.

DESCRIPTION OF THE RELATED ART

Thus, in FR 2 294 496, it is possible to construct chords and to find their names for a limited number of chords, namely 462 chords. In particular, for a given chord, the names of the chords generated for the same given scale, i.e. the harmonically-compatible chords, are not provided.

Moreover it is not possible to find or to construct a chord if its fundamental note is a sharp, a flat or a double sharp.

The above document describes a device for the study of musical chords and their transpositions comprising:
- a rectangular base on which musical data is marked, in particular written; and
- at least one sliding rectangular member called the cursor adapted to slide longitudinally (XX') relative to said rectangular base on which complementary musical data is marked, in particular written.

However, the above device has omissions and drawbacks including:
- the device represents the 12 semitones of the octave and the names of the natural notes but does not include the names of the chromatic notes (modified notes); it is therefore not possible to choose between a Fa♯ and a Sol♭, which falsifies any harmonic interpretation of the intervals or degrees of a given scale;
- the device cannot represent scales comprising both sharps and flats, such as harmonic and melodic minor scales;
- the device does not respect the rules for constructing scales; in particular it lacks the Do♯ major scale, including the Si♯ and the Fa♯ major scale, including the note Mi♯; the device indicates the composition of scales that do not conform to the fundamental rules of harmony; thus the Re♯ major scale that requires an x in its composition is not used (Mi♭ major enharmonic scale).

This device is therefore limiting and/or approximate and/or does not conform to the fundamental rules of harmony.

Finally, and most importantly, the device of FR 2 294 496 sets out musical data but does not make it possible to provide a sequential and complete harmonic analysis thereof.

SUMMARY OF THE INVENTION

One object of the present invention is therefore to provide musical data that is as complete as possible and that enables detailed analysis in its harmonic context as well as its transposition in accordance with the rules of harmony.

Another object of the present invention is to provide a device for providing overall or specific harmonic musical data adapted to the use of all scales, all intervals and all chords.

A further object of the present invention is to provide a device for providing musical data that is simple and fast to read and analyze.

To this end, the present invention provides a device for providing and analyzing musical data, comprising:
- a rectangular support element called base on which musical data are marked, in particular written; and
- at least one rectangular sliding element called cursor able to slide longitudinally (XX') relative to said rectangular base on which complementary musical data are marked, in particular written;

the device being characterized in that it comprises at least:
a) a rectangular base on which are marked:
- first graduations aligned in said longitudinal direction of the base, said successive first graduations being spaced at equal intervals of length that corresponds to a frequency difference of one semitone and defining at least 24 intervals of one semitone; and
- musical data consisting in the seven names of the seven natural notes of a heptatonic scale and the 14 names of sharpened and flattened notes disposed in said longitudinal direction of the base in order of increasing frequency, repeated over at least two octaves, disposed near, and preferably aligned vertically with, said first graduations; and b) the following two cursors adapted to slide independently of each other longitudinally (XX') relative to said rectangular base:
b1) a first cursor on which are marked:
- at least second graduations aligned in said longitudinal direction, successively spaced at an interval of length that corresponds to a multiple of one semitone, according to the intervals of the notes of a given category of scales, defining at least 14 intervals; and
- the successive degrees of the successive notes of a said given category of scales, preferably in the form of the numbers I to VII for the first octave of the scale and preferably with a symbol, such as "Oct", marking the passage to the next octave and then the numbers II to VII for the successive degrees of the next octave, disposed facing said successive second graduations; and b2) a second cursor on which are marked third graduations disposed along a line in the longitudinal direction (XX'), said third graduations being spaced at equal distances corresponding to one semitone over at least two octaves, with the writing of the names of the second, third, fourth, fifth, sixth, and seventh intervals at least at the level of said third graduations of the first octave and preferably also the ninth, eleventh, and thirteenth intervals at least at the level of said third graduations of the second octave, namely and preferably at least names identifying the minor $2^{nd}$, major $2^{nd}$, augmented $2^{nd}$, minor $3^{rd}$, major $3^{rd}$, diminished $4^{th}$, perfect $4^{th}$, augmented $4^{th}$, diminished $5^{th}$, perfect $5^{th}$, augmented $5^{th}$, minor $6^{th}$, major $6^{th}$, diminished $7^{th}$, minor $7^{th}$, major $7^{th}$ at the level at least of said third graduations of the first octave and preferably the minor $9^{th}$, major $9^{th}$, augmented $9^{th}$, minor $10^{th}$, major $10^{th}$, diminished $11^{th}$, perfect $11^{th}$, augmented $11^{th}$, minor $13^{th}$, and major $13^{th}$ at the level of said third graduations of the second octave.

In the present description, the expression "the vertical direction" means a direction perpendicular to said longitudinal direction, on the supposition that said longitudinal direction is disposed horizontally.

The device of the invention, by sliding the first cursor so as to dispose the degree I facing the first graduations, makes it possible to retrieve the series of notes of the tonalities of all scales of the category of scales given by the first cursor.

In contrast, by sliding said second cursor in front of said first graduations and the natural and modified notes that are juxtaposed to them, it is possible to retrieve the name of any chord from the known notes or conversely to retrieve the constituent notes of any chord of known name by moving the first of said third graduations in front of the first note of the fundamental chord or note.

Moreover, by moving said first and second cursors conjointly on said base, it is possible to find the note, scale and/or chord resulting from transposing by a given interval a particular note, scale and/or chord.

Note that the device of the invention makes it possible to retrieve or to provide all possible chords for the given categories of scales, notably for the major and minor scales.

Finally, by having the first and second cursors cooperate with the base, it is possible, starting from a given chord in a scale, to retrieve the chord corresponding to the preceding and following degrees in the scale concerned by said first cursor.

The device of the invention is thus an indicator of notes, tonalities, scales, chords and intervals for all heptatonic scales and derivatives thereof respecting the fundamental rules of harmony.

It is therefore clear that the base and/or said first and second cursors comprise means enabling them to slide relative to said first and/or second cursors, respectively and/or said base.

Clearly there are 25 successive first and third graduations, the distance separating the successive first and third graduations corresponding to a semitone is the same on said second cursor and said base, and there are at least 15 second graduations on said first cursor, the final graduation marking the first degree of the second octave.

Clearly said first cursor may carry said second graduations of the different degrees of the same category of scales and be interchangeable to cover any different category of scales.

The names of the various natural notes may be written in accordance with the conventions in various countries, notably in Latin countries in the form Do, Re, Mi, Fa, Sol, La, Si or in English-speaking countries in the form C, D, E, F, G, A, B (or H), or in other forms of transcription system.

The scale categories most used are the major diatonic scale and the ascending harmonic and melodic minor scales.

The major diatonic scale consists of the successive notes Do, Re, Mi, Fa, Sol, La, Si, Do corresponding to the natural resonances of the sound bodies. It is the only major diatonic scale not using any sharps and flats. The other scales of the category of major scales known as "major scale tonalities" comprise a major third and a fifth relative to the tonic note.

Said second graduations defining the intervals of the successive degrees of the diatonic major scale have lengths successively corresponding to tone, tone, semitone, tone, tone, tone, semitone.

To form a minor harmonic scale for a major scale it is necessary to raise by a semitone the note of degree V (dominant) of this major scale to give it the rank of degree VII (leading) and thus to take as tonic of the minor harmonic scale the note of degree VI (submediant) of the major scale.

The ascending minor melodic scale is a minor harmonic scale of which the sixth degree (submediant) has been raised a chromatic semitone, i.e. a semitone placed between two notes with different names.

The descending minor melodic scale is identical to the relative minor scale.

More generally, what is known as a "minor scale" or "minor tonality" is a scale comprising a minor third and a perfect fifth relative to the tonic note.

For the minor scales, the second graduations defining the intervals of successive degree have successive lengths corresponding to:
  minor harmonic scale: tone, semitone, tone, tone, semitone, three semitones, semitone; and
  ascending minor melodic scale: tone, semitone, tone, tone, tone, tone, semitone.

Concerning said second cursor, the terms second, third, etc. correspond in the manner known to the person skilled in the art to note names relating, firstly, to the length of the interval relative to the first of said third graduations when the first graduation is assigned to a fundamental note and, secondly, to the number of notes included in the interval corresponding to said third graduation, relative to the first of said third graduations. The terms second, third, fourth, fifth, sixth and seventh thus correspond to intervals relative to a fundamental note containing 2, 3, 4, 5 or respectively 6 and respectively 7 notes.

The doubled intervals are obtained by adding an octave to the single interval, the terms ninth, tenth, eleventh and thirteenth namely corresponding respectively to doubled second (2+7=9), doubled third, doubled fourth and doubled sixth. The other doubled intervals are not used.

It is known that for some third graduations there may be a plurality of different names for the same sound, depending on the number of notes included in the interval between the first and third graduations relating to said given note, according to the different categories of scales concerned.

Thus the fourth of said third graduations defining the third interval may correspond to:
  an augmented $2^{nd}$ if the interval corresponds to a "diatonic" tone, i.e. two notes with different names plus an additional "chromatic" semitone, i.e. between two notes with the same name that do not have the same sound, i.e. that have a different modification; or
  a minor $3^{rd}$ if the interval corresponds to a diatonic tone with added diatonic semitone;
  the fifth of said third graduations may correspond to a major $3^{rd}$ or a diminished $4^{th}$;
  the seventh of said third graduations may correspond to an augmented $4^{th}$ or a diminished $5^{th}$;
  the ninth of said third graduations may correspond to an augmented $5^{th}$ or a minor $6^{th}$;
  the eleventh of said third graduations may correspond to a diminished $7^{th}$ or a major $6^{th}$.

The sixteenth of said third graduations (the fourth graduation of the second octave of the third graduations) may correspond to an augmented $9^{th}$ or a minor $10^{th}$.

The seventeenth of said third graduations (the fifth of said third graduations of the $2^{nd}$ octave) may correspond to a major $10^{th}$ of a diminished $11^{th}$.

The second cursor thus carries against some of said above-mentioned third graduations both of the above-mentioned alternative note names to which they may correspond.

Furthermore, for practical reasons of use of the second cursor, the second, third, fourth, fifth, sixth, and seventh note names may be repeated with regard to said third graduations of the second octave by associating therewith the note names of the first octave with the added note names $9^{th}$, $10^{th}$, $11^{th}$, and $13^{th}$.

Although the device may describe all heptatonic scales, showing a scale and its 15 tonalities and taking into account that each tonality generates seven derived modes, it is possible to obtain 105 derived modes or scales for each category of scales, the specific combination of the cursor or cursors of the device and the information thereon making it possible to provide correct and coherent musical data by associating (aligning and superposing) graduations from different parts of the device: notes, tonalities, scales, and intervals or modifications from which the chords and modes stem.

In the device of the invention, said base (A) preferably further includes identification marks for identifying the 15 tonalities of scales comprising the fewest said modifications in the key signature and not simultaneously comprising sharps and flats for said concerned category of scales.

Said 15 scale tonalities including the least modifications identified on said base correspond to the tonalities of scales including, in the tonality signature respectively zero sharps and zero flats, one to seven sharps and zero flats, and one to seven flats and zero sharps. These tonalities are the most usual scale tonalities according to the fundamental rules of harmony.

Thus when transposing scales or chords by a particular interval it is possible to exclude if necessary the tonalities of scales that are not identified among the 15 tonalities including the least alterations (modifications) and conforming best to the rules of harmony. In particular, this identification makes it possible to choose which note or tonality is compatible with the rules of harmony if the first or second cursor indicates two above-mentioned alternative note names, if any, against one of said first graduations of the base with which a given second or respectively third graduation is aligned vertically by sliding.

The device is more particularly advantageous if:
said first cursor slides in a groove of said base so that the upper face of said base carrying said musical data markings comprising said first graduations and said note names and the upper face of said first cursor comprising the markings of said second graduations are coplanar and said first cursor preferably being disposed relative to said base in such a manner that the line defining said second graduations and the line defining said first graduations of notes marked on said base define the longitudinal edges of said grooves and first cursor so that, where applicable, at least one of said first graduations may be vertically aligned with one of said second graduations, preferably on either side of a common definition line, by sliding said first cursor in said longitudinal direction; and
said second cursor is transparent and slides above the upper faces of the combination of said base and said first cursor with said line that defines said third graduations coinciding with the line that defines said first graduations of said base of said first cursor.

Referring to the common vertical line defining said first graduation of the base and said second graduation of the first cursor, it is therefore clear the note names on the base appear above or below said line but on the same side of said line, the degree names on the first cursor appearing on the side of said line opposite the side comprising the names of the notes on the base.

More particularly, the names of the natural notes and sharpened or flattened notes appear on said base with:
an upper line of notes comprising the notes;
an intermediate line comprising sharpened notes vertically aligned under the corresponding flattened notes; and
a lower line of notes comprising the natural notes; and said natural and modified notes being aligned vertically with said first graduations, two notes sharpened and flattened notes with different names intercalated between two successive natural notes spaced by one tone being vertically aligned with the same first graduation.

It is known that when two successive natural notes are spaced by a tone, the two modified notes with different names and of frequency that is between the frequencies of the two successive natural notes are associated with the same frequency spaced by a semitone relative to the frequency of the first natural note and are superposed. This therefore applies to the following pairs of modified notes: (Re♭, Do♯), (Mi♭, Re♯), (Sol♭, Fa♯), (La♭, Sol♯), (Si♭, La♯), the modified notes Fa♭ and Mi♯ being respectively vertically aligned with the notes Mi and Fa spaced by a semitone and the notes Do♭ and Si♯ being respectively vertically aligned with the notes Si and Do also spaced by a semitone.

Even more particularly, said base further comprises the inscriptions of the names of at least some of the double sharp notes, preferably on the same line in said longitudinal direction as the sharpened notes, preferably at least the following double-sharp notes: Dox, Fax, and Solx.

According to the rules of harmony these three notes Dox, Fax, and Solx are the three notes needed to format the minor scales.

Said identification marks for identifying said 15 tonalities of scales on said base including the fewest said modifications of the sharp and flat types comprise advantageously the writing of the 15 tonalities of scales, namely:
for the major scale: Do, Do♯, Re♭, Re, Mi♭, Mi, Fa, Fa♯, Sol♭, Sol, La♭, La, Si♭, Si, Do♭; and
for the minor scales: La$_m$, La♯$_m$, Si♭$_m$, Si$_m$, Do$_m$, Do♯$_m$, Re$_m$, Re♯$_m$, Mi♭$_m$, Mi$_m$, Fa$_m$, Fa♯$_m$, Sol$_m$, Sol♯$_m$ and La♭$_m$ (the subscript m standing here for "minor").

Said base even more particularly includes a groove in which said first cursor is adapted to slide and said base is divided between:
an upper part (D) situated above said groove comprising said first graduations and said names of the natural notes and said modified notes disposed above said first graduations; and
a lower part (E) comprising:
fourth graduations vertically aligned with said first graduations of the upper part; and
the names of the 15 tonalities of scales including the fewest said modifications for said given category of scales of said first cursor;
said names of the 15 tonalities being disposed as follows:
the names of the tonalities are aligned vertically with the identical notes of said upper part;
the names of the tonalities comprising sharps are aligned on an upper line in the longitudinal direction;
the names of the tonalities comprising flats are aligned on a lower line in the longitudinal direction; and
the name of the key without modifications in the key signature is disposed twice on an intermediate line, offset longitudinally outside the upper and lower lines and repeated at each end; and
under each of said 15 tonalities of scales, there are preferably written the number and nature of the sharp, flat or natural type modifications found in the key signature and on the stave in a score for the scale concerned.

Clearly the juxtaposition of these lower, upper, and intermediate lines makes it possible to constitute a loop illustrating the harmonic cycles and making it possible, by permutation, to provide an easy mnemonic for retrieving notes after transposition according to a particular rule for shifting intervals.

Thus for the major and minor scales, the 15 scale tonalities least modified are marked as follows:

for the major scale, the lower part comprises the following successive tonalities: Do♯, Re, Mi, Fa♯, Sol, La, Si, respectively facing the second, third, fifth, seventh, eighth, tenth, and twelfth of said fourth graduations, in a upper line, and the following successive tonalities: Re♭, Mi♭, Fa, Sol♭, La♭, Si♭, and Do♭, facing said second, fourth, sixth, seventh, ninth, eleventh, and twelfth of said fourth graduations, in the lower line of the lower portion of the base, and the tonality Do being written twice, respectively facing the first and thirteenth of said fourth graduations aligned along an intermediate line between said upper line and said lower line; and for the minor scales: the tonalities $La♯_m$, $Si_m$, $Do♯_m$, $Re♯_m$, $Mi_m$, $Fa♯_m$, and $Sol♯_m$ are written facing said second, third, fifth, seventh, eighth, tenth, and twelfth of said fourth graduations in the upper line and the following tonalities: $Si♭_m$, $Do_m$, $Re_m$, $Mi♭_m$, $Fa_m$, $Sol_m$, $La♭_m$ are written facing the second, fourth, sixth, seventh, ninth, eleventh, and twelfth of said fourth graduations on the lower line with the $La_m$ tonalities facing the first and twelfth of said fourth graduations aligned on an intermediate line between said upper and lower lines.

The number of modifications is different for each of said scales so that the device of the invention makes it possible to retrieve which scale tonality is relevant in a given score, uniquely by identifying the number of modifications in the key signature on the score. It should be noted that for the major scales, there is no modification on the stave. The number and the nature of the modifications for the major and minor scales are explained in the detailed description with reference to the figures given below.

In a preferred embodiment said first cursor comprises at least one of the following additional musical data in written form facing said second graduations and called names of degrees disposed on different lines in the longitudinal direction and superposed:

the end part of the name of the four-note chords of said given category of scales of said first cursor, the fundamental of which chord corresponds to the first part of the name of the chord, is determined by the note indicated on said base against said first graduation coinciding with said second graduation of said first cursor facing that the said end part of the name of said chord;

the names of the tonal functions of the various degrees;

the names of the modal functions of the various degrees; and the size of the interval, namely one tone, one semitone or three semitones, between the names of the successive degrees I to VII according to the category of scales concerned.

Writing the end parts of the names of four-note chords makes it possible to reconstitute harmonic chord sequences insofar as the chords the most used for a given scale are concerned by indicating for each scale the names of the previous and next chords that conform to the rules of harmony.

It must be remembered that the four-note chords consist of a fundamental note and the following $3^{rd}$, $5^{th}$, and $7^{th}$ notes. One of the conventional notations for chords is as follows: when the third is major, it is not indicated and, when the third is minor, min is indicated. Moreover, if the $7^{th}$ is minor for a minor chord, it is not indicated. The ends of the names of the four-note chords for the major and minor scales are explained in the detailed description with reference to the figures given below.

The intervals of the major and minor scales between the successive degrees I to VII are given above.

With regard to the respective degrees I to VII the names of the tonal functions of the various degrees are identical for all the scales and are as follows: tonic, supertonic, mediant, subdominant, dominant, submediant and leading.

The names of the modal functions of the notes as a function of the various degrees differ according to the scale categories and for the major scale correspond for the respective degrees from I to VII to the following modes: Ionian, Dorian, Phrygian, Lydian, Mixolydian, Eolian, and Locrian.

Said second cursor advantageously comprises a median line in the longitudinal direction carrying said third graduations and the following names situated on either side of said line, namely:

the names of the thirds comprising the minor $3^{rd}$ and the major $3^{rd}$, the fifths comprising a diminished $5^{th}$, a perfect $5^{th}$ and an augmented $5^{th}$, and the $7^{ths}$, comprising a diminished $7^{th}$, a minor $7^{th}$, and a major $7^{th}$, with different colors for the thirds, fifths, and $7^{ths}$, situated on the same side of said median line of said corresponding third graduations, preferably the upper side, preferably repeated over two octaves, with preferably in addition for the second octave the $10^{ths}$ comprising the minor $10^{th}$ and major $10^{th}$; and the names of the seconds comprising the minor $2^{nd}$ ("$2^e$min" in the figure), major $2^{nd}$, and augmented $2^{nd}$, the fourths comprising the diminished $4^{th}$, perfect $4^{th}$ and augmented $4^{th}$, the sixths comprising the minor $6^{th}$ and major $6^{th}$, preferably repeated over two octaves, preferably the $9^{ths}$, comprising the minor $9^{th}$, major $9^{th}$, and augmented $9^{ths}$, the $11^{ths}$ comprising the diminished $13^{ths}$, comprising the minor $13^{th}$ and major $13^{th}$, facing said corresponding third graduations for the second octave, disposed on the other side of said line of third graduations with different colors from those of the names of the thirds, fifths and $7^{ths}$; and the names, preferably situated on the upper side of said median line, being written on the upper part of said second cursor projecting beyond said base.

Thus the names in question, in particular the names of thirds, fifths, and $7^{ths}$, do not overlap with the names on the upper portion of said base.

The repetition of the names of the thirds, fifths, and $7^{ths}$ over two octaves is of practical reading benefit in that these are the most important and the most used intervals. This presentation also facilitates reading inverted chords.

Said base advantageously comprises, preferably in its lower part, fifth graduations with indications of reading clefs comprising a written designation of the clef of sol aligned vertically with the note Do written on the base and indications of the reading clefs Ut $3^{rd}$, Fa $4^{th}$, Ut $2^{nd}$, Fa $3^{rd}$, Ut $1^{st}$, and Ut $4^{th}$ disposed successively, aligned in said longitudinal direction and each aligned vertically with one of said first graduations and where appropriate, said fourth graduations of the base, respectively corresponding at least to the following notes: Re for Ut $3^{rd}$, Mi for Fa $4^{th}$, Fa for Ut $2^{nd}$, Sol for Fa $3^{rd}$, La for Ut $1^{st}$, and Si for Ut $4^{th}$.

The reading clefs Ut $1^{st}$, Ut $2^{nd}$, Ut $3^{rd}$, Ut $4^{th}$, Fa $3^{rd}$, and Fa $4^{th}$ are obtained respectively by successive descending thirds from Do.

This feature is particularly advantageous if the device is used by a musician who plays a wind instrument such as a horn, clarinet, flute, oboe, saxophone or trumpet, which are known as "transposing" instruments, where a note other than Do must be heard when Do is read in the usual Clef of sol and for instruments using a reading clef other than Sol. These instruments require transposition with one of the above-mentioned reading clefs.

Thus the device of the invention is not only an indicator of notes, tonalities and scales, modes, chords and intervals, but also of key signatures, transpositions and clefs appropriate to the use of heptatonic scales and their derivatives and particularly suited to application of the fundamental rules of harmony.

BRIEF DESCRIPTION OF THE DRAWINGS

Other features and advantages of the present invention become apparent in the light of the following detailed description of embodiments of the invention given with reference to the following figures:

FIG. 1 shows a device of the invention as seen from above;

FIG. 2 shows the FIG. 1 device in cross-section taken along the line Y1Y'1 in FIG. 1;

DETAILED DESCRIPTION OF THE INVENTION

Figure 3:
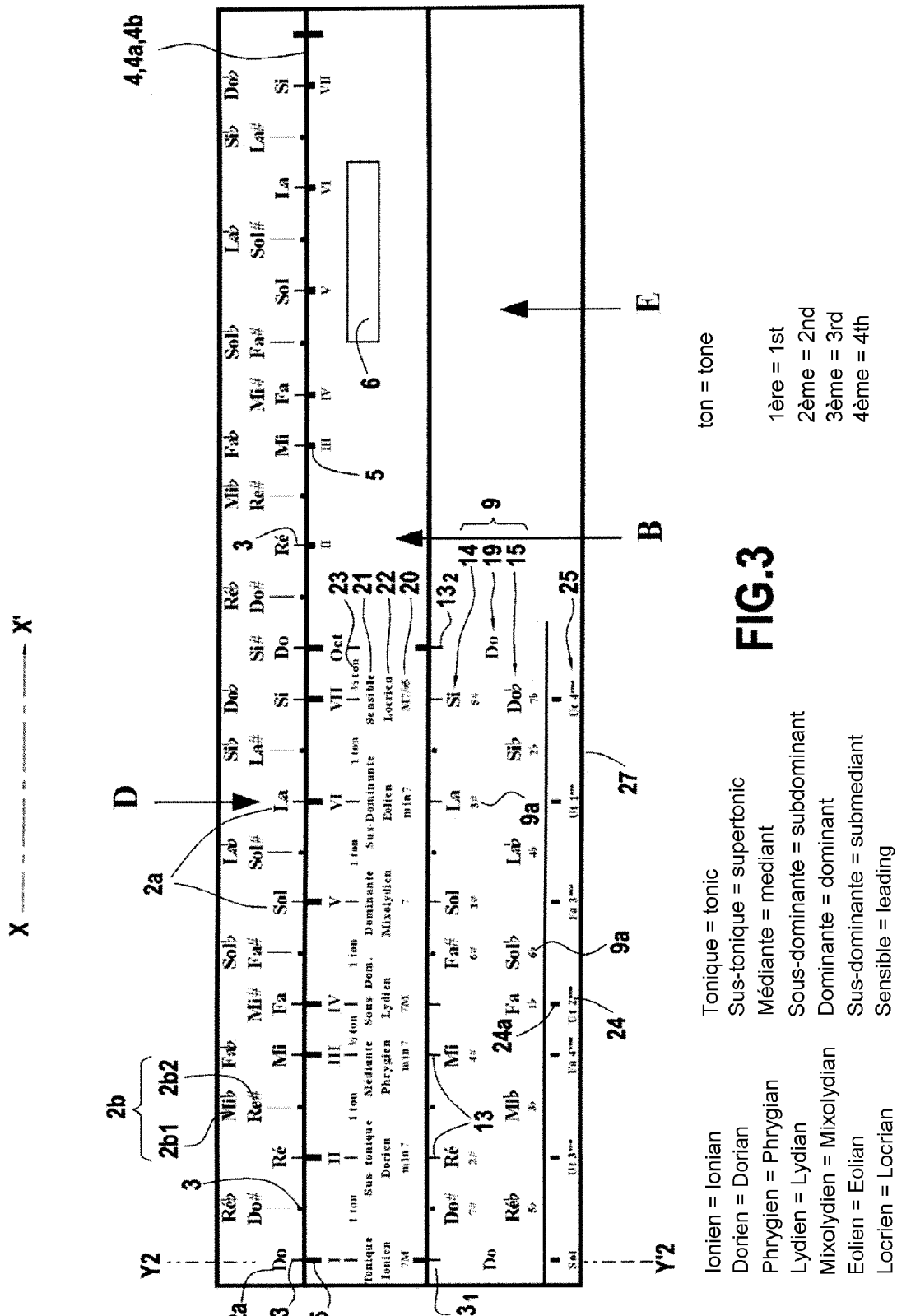
FIG. 3 shows an embodiment of the base A cooperating with a first cursor B dedicated to the category of major scales.

In the present description, the symbol ♭ represents flat, the symbol ♯ represents sharp, and the symbol x represents double sharp (x being also written as double dièse).

The device described with reference to FIGS. 1 to 10 is a device for providing musical data comprising a rectangular base A cooperating with two cursors B and C on which base and cursors appears musical data concerning notes, scales, tonalities, intervals, and chords, this data being provided in an analytical manner and according to the fundamental rules of harmony.

The rectangular base A comprises a central longitudinal groove 12 in which the first cursor B slides. The second cursor C slides on top of the base A and the first cursor B.

The base A carries musical data for the natural and chromatic notes and their various harmonic cycles with the tonality of the scales and preferably the transposed clefs.

The first cursor B carries information relating to the intervals of a given category of scales associated with these chords and the second cursor C carries information relating to their intervals, their inversions and the formation of the chords and, because it is transparent, makes it possible to read the information on the first cursor B.

FIGS. 1 and 2 show a device 1 that includes the following three elements:

1) a rectangular supporting base A extending in the longitudinal direction XX' and including a longitudinal groove 12 over the whole of the length of the supporting base A;

2) a first cursor or interior cursor B disposed in said longitudinal groove 12 of the base A so that the upper face 30 of the first cursor B is coplanar with the upper face 31 of the supporting base A; the first cursor B divides the upper surface of the supporting base A into two separate parts referred to as the upper part D and the lower part E of the supporting base A, the respective heights of the upper part of the first cursor B and the lower part E of the supporting base A being substantially identical;

3) a transparent second cursor C covering the combination of the supporting base A and the first cursor B with an upper part C1 extending above the upper part D of the supporting base A.

In the present description, the terms "upper" and "lower" refer to a position relative to the longitudinal direction XX' when said direction is horizontal.

The first cursor B, the supporting base A and the second cursor C are substantially the same length, which may lie in the range 20 centimeters (cm) to 40 cm, preferably being approximately 30 cm, and the overall height of the supporting base may lie in the range 5 cm to 10 cm, preferably being approximately 7 cm, the height of the second cursor then being approximately 10 cm. They may be produced in plastics materials, for example, in particular in polymethylmethacrylate (PMMA).

In an embodiment shown in FIG. 2, the second cursor has a lower groove 26 in which slides the combination of the supporting base A and the first cursor B in the longitudinal direction XX'. In practice, it is the second cursor C that is made to slide on the base A, the longitudinal edges of the groove 26 of the second cursor bearing on the longitudinal edges of the base. The part C2 of the second cursor, straddling the base A and the first cursor B, has its lower face just above the upper face 31 of the base element A and that 30 of the first cursor B, the upper face of the upper part C1 of the second cursor C being at the same level as the upper face of the part C2 of the second cursor.

The first and second cursors B and C are thus also of rectangular shape, extending in the longitudinal direction XX'.

Figure 4:
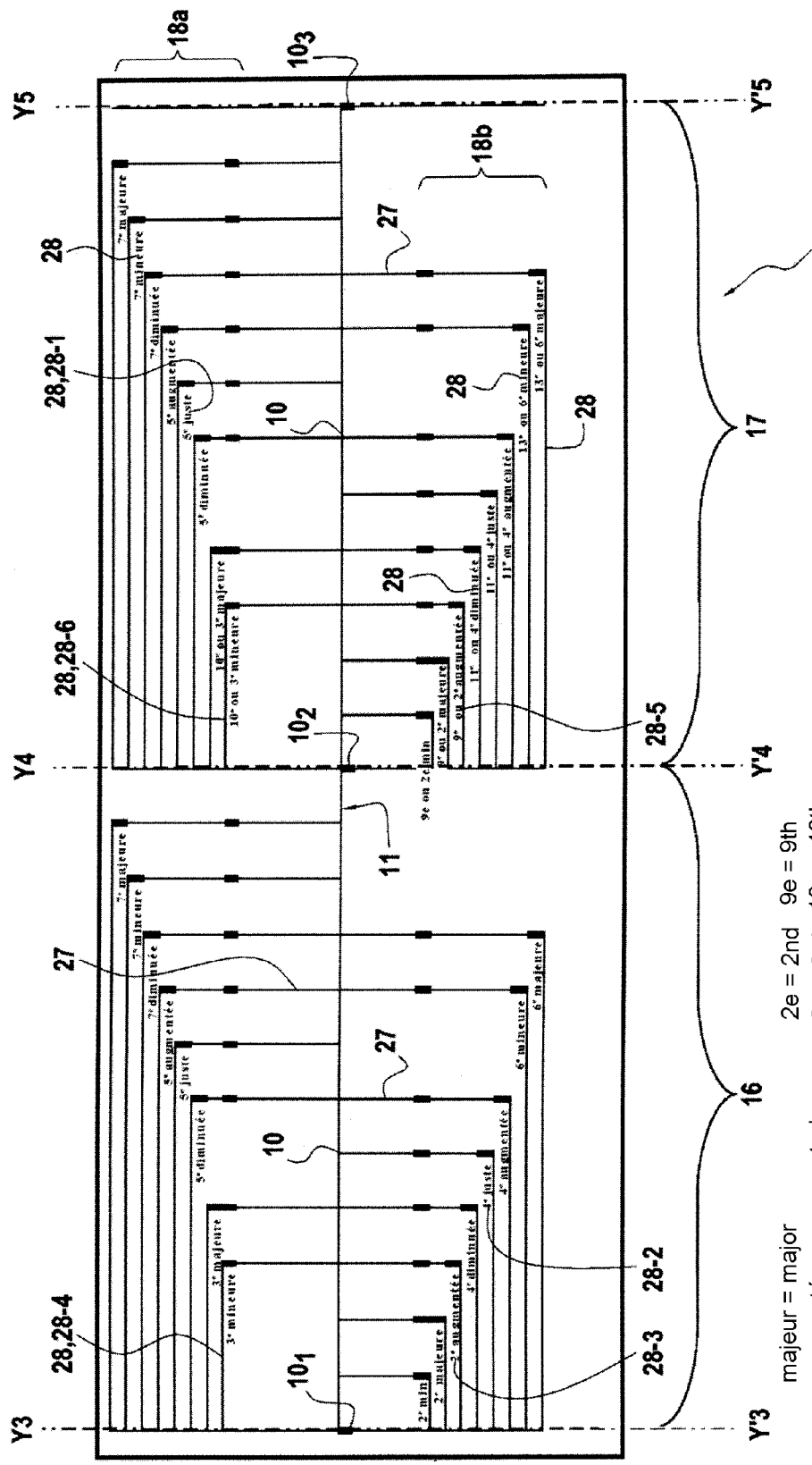
FIG. 4 shows the second cursor or upper cursor C as seen from above.

The upper face of the second cursor shown in FIG. 4 carries identical inscriptions for all embodiments of the other part of the device with which it cooperates, that other part consisting of the combination of the base A and the first cursor B. In contrast, the combination of the base A and the first cursor B is appropriate to a given category of scales.

Figure 10:
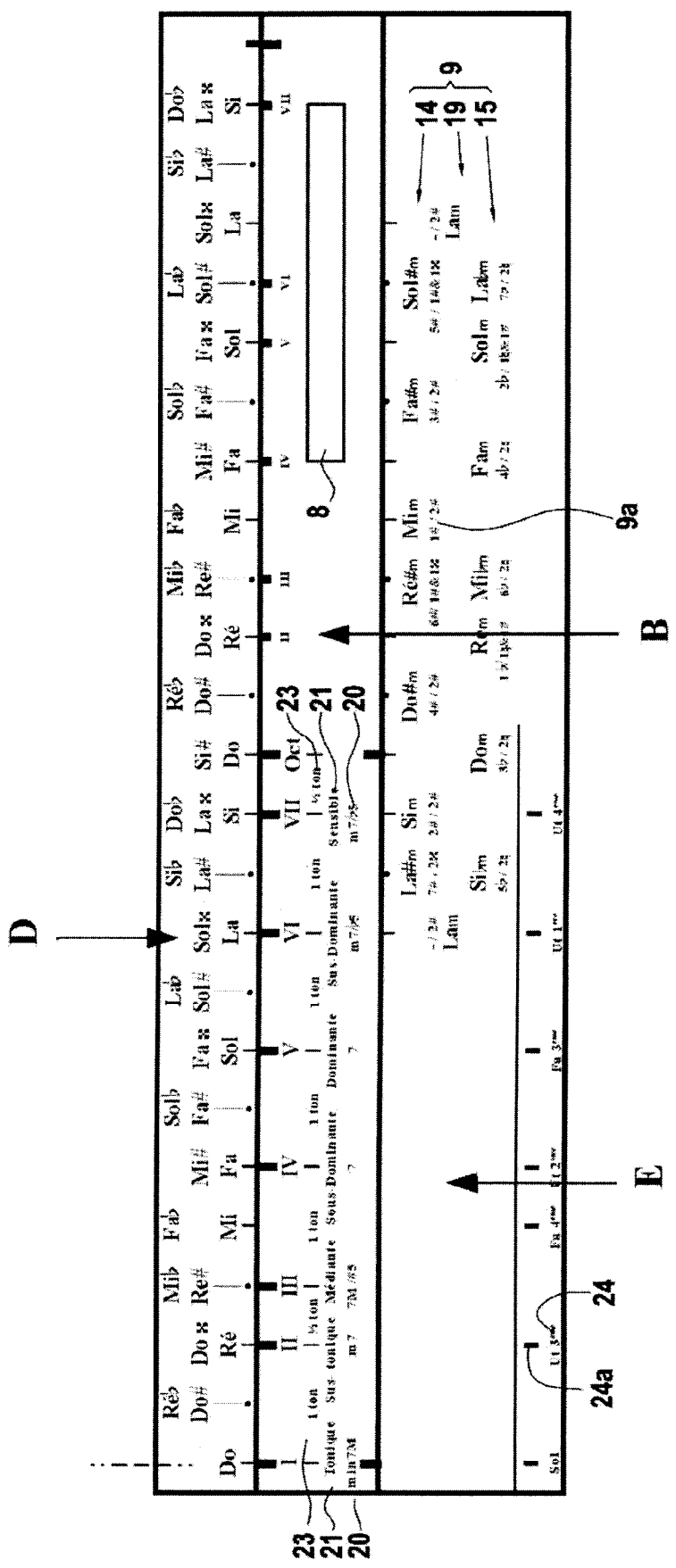
FIG. 10 shows the base A of the device 1 and its interior first cursor B for the ascending minor melodic scales.

Thus FIGS. 3, 5 to 7, and 10 show embodiments respectively dedicated to major scales (FIGS. 3, 6, and 7), harmonic minor scales (FIG. 5), and ascending melodic minor scales (FIG. 10).

Figure 5:
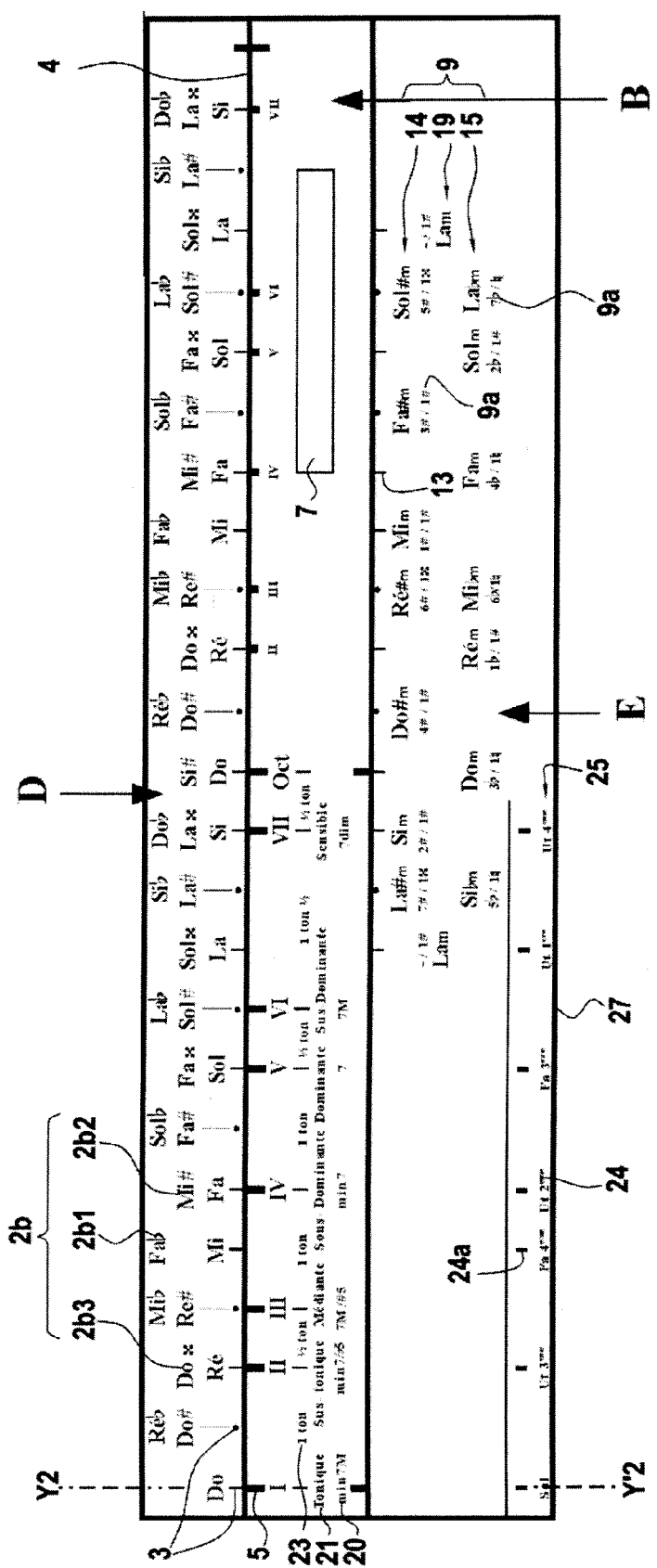
FIG. 5 shows the combination of the base A and the first cursor B for the category of minor harmonic scales.

On the cursor B, as shown in FIGS. 3 and 5 to 10:
the frame 6 reads "major scale" in FIGS. 3 and 6 to 9;
the frame 7 reads "harmonic minor scale" in FIG. 5;
the frame 8 reads "ascending melodic minor scale" in FIG. 10.

The upper part D of the base A includes, starting from the bottom, a lower line 4, 4a defining the upper edge of the groove 12 in which the first cursor B slides, this line 4, 4a being graduated with 25 graduations referred to as first graduations 3 defining 24 equal intervals in the longitudinal direction XX' of the line 4.

Above this line 4 with the first graduations 3 are the names 2a of the natural notes of the heptatonic scale, respectively from left to right: Do, Re, Mi, Fa, Sol, La, Si, repeated once, i.e. over two octaves. The successive first graduations 3 are spaced from each other by exactly the same interval corresponding to a frequency difference of one semitone.

In FIGS. 1 to 10, the notes and chords are written according to the Latin transcription Do, Re, Mi, Fa, Sol, La, and Si but could be written according to the names in use in other countries, notably C, D, E, F, G, A, and B, respectively, in the notation as used in English-speaking countries in particular.

The natural notes Do, Re, Mi, Fa, Sol, La, Si are thus disposed in line with the first, third, fifth, sixth, eighth, tenth, and twelfth first graduations 3 for the first octave and the thirteenth, fifteenth, seventeenth, eighteenth, twentieth, twenty-second, and twenty-fourth first graduations 3 for the second octave.

On a line disposed above the line 2a of natural notes are the sharpened notes 2b2, namely the successive notes Do♯, Re♯, Mi♯, Fa♯, Sol♯, La♯, and Si♯, vertically aligned with the second, fourth, seventh, ninth, eleventh, and thirteenth first graduations 3, respectively. Thus the note Do♯ appears above and between the natural notes Do and Re, the note Re♯ appears above and between the natural notes Re and Mi, the note Mi♯ appears above the natural note Fa, the note Fa♯ appears above and between the natural notes Fa and Sol, the note Sol♯ appears above and between the natural notes Sol and La, the note La♯ appears above and between the natural notes La and Si, and the note Si♯ appears above the natural note Do.

The flattened notes on the line 2b1 are situated on an upper line situated above the line 2b2 of sharpened notes, vertically aligned with said first graduations 3 corresponding to the frequency intervals. Thus Re♭ is disposed above Do♯, between the natural notes Do and Re or aligned with the second of the first graduations 3, Mi♭ is aligned with the fourth first graduation 3, above Re♯ and between the natural notes Re and Mi, Fa♭ above the fifth of the first graduations 3 and the natural note Mi, Sol♭ above the note Fa♯, aligned vertically with the seventh of the first graduations 3, La♭ is aligned with the ninth of the first graduations 3 above the note Sol♯, Si♭ is aligned with the eleventh of the first graduations 3 above the note La♯, and Do♭ is aligned with the twelfth of the first graduations 3 above the note Si. The flattened notes on the line 2b1 are repeated over two octaves, like the natural notes on the line 2a and the sharpened notes on the line 2b2.

In the embodiment of FIGS. 5 and 10, appropriate to the categories of harmonic minor scales and ascending melodic minor scales, there are further represented on the line 2b3 the double sharp notes: Dox, Fax, Solx, and Lax, on the line of the sharpened notes alongside them. Thus Dox above the third first graduation 3 above the note Re, Fax is situated above the eighth first graduation 3 above the note Sol, and Solx is situated above the tenth first graduation 3 above the note La. Lax is situated above the twelfth first graduation 3 above the note Si. Once again, the double sharp notes are repeated over two octaves.

The upper part D of the base A therefore includes, from the bottom upwards:
- a line 4 of first graduations 3 defining the 12 semitone intervals of the octave and spanning two octaves;
- a line 2a of the names of natural notes aligned vertically over their first graduations 3;
- a line 2b2 sharp notes and a line 2b3 of double-sharp notes aligned vertically over their first graduations; and
- a line 2b1 of the names of flat notes aligned vertically over their first graduations.

The first cursor B carries second graduations 5 along its rectilinear upper edge defining a line 4, 4b juxtaposed to or combined with the line 4, 4a at the lower edge of the upper part D of the supporting base A.

These second graduations 5 are spaced by a length corresponding to a multiple of a semitone, according to the intervals the notes of a given category of scales.

Below said graduations 5 are marked the successive degrees I to VII of the successive notes of the given category of scales for the first octave and the successive indications "Oct" and II to VII for the successive degrees of the next octave (the symbol "Oct" may be replaced by the first few letters of the word for "octave" in another language).

When the first of said second graduations 5 corresponding to the degree I is aligned vertically with the first of said third graduations 3 corresponding to the natural note Do, the other successive second graduations 5 coincide in vertical alignment with some of said first graduations 3 on the base.

For the device appropriate to the major scales shown in FIG. 3, the successive second graduations 5, the degrees I to VII, and the first degree "Oct" of the next octave are spaced by successive intervals corresponding to: tone, tone, semitone, tone, tone, tone, semitone and are thus disposed successively facing the first, third, fifth, sixth, eighth, tenth, and twelfth of said first graduations 3 for the first octave, i.e. for the first seven second graduations 5, and facing the thirteenth, fifteenth, seventeenth, eighteenth, twentieth, twenty-second, and twenty-fourth first graduations 3 for the thirteenth, fifteenth, seventeenth, eighteenth, twentieth, twenty-second, and twenty-fourth second graduations 5, respectively for the second octave of degrees "Oct" and II to VII.

For the FIG. 5 harmonic minor scale, the first seven second graduations 5, the successive first degrees I to VII following Oct of the next octave are spaced by successive intervals corresponding to: tone, semitone, tone, tone, semitone, 3 semitones, semitone.

For the FIG. 10 ascending melodic minor scale, the successive degrees I to VII and the first degree "Oct" of the next octave are spaced by the following successive intervals: tone, semitone, tone, tone, tone, tone, semitone.

In FIG. 10, when the first degree I of the first cursor B is vertically aligned below the natural note Do of the first graduation 3 of the upper part D of the base A, the successive second graduations 5 are respectively aligned with the third, fourth, sixth, eighth, tenth, twelfth, and thirteenth first graduations 3, i.e. the successive degrees II to VII and Oct of the next octave are aligned with the notes Re for degree II, Mi♭ and Re♯ for degree III, Mi♯ and Fa for degree IV, Fax and Sol for degree V, Solx and La for degree VI, Do♭, Lax, and Si for degree VII, Si♯, and Do for degree Oct.

In FIGS. 3, 5, and 10, the first cursor B also carries the following additional musical data in the form of inscriptions disposed below the inscriptions of the successive degrees I to VII and first degree Oct of the next octave:
- the inscription 23 of the interval between two successive degrees written below and between the successive degrees, namely, and successively:
  - for the major scale (FIGS. 3 and 6 to 9): tone, tone, semitone, tone, tone, tone, semitone;
  - for the harmonic minor scale (FIG. 5): tone, semitone, tone, tone, semitone, 3 semitones, semitone;
  - for the ascending melodic minor scale (FIG. 10): tone, semitone, tone, tone, tone, tone, semitone;
- the names 21 of the tonal functions of the degrees of FIGS. 3 and 5 to 10, namely under degree I: tonic, under degree II: supertonic, under degree III: mediant, under degree IV: subdominant, under degree V: dominant, under degree VI: submediant, and under degree VII: leading;
- on the lower line just above the lower edge of the first cursor, the inscriptions 20 of the end parts of the names of the four-note chords of said given category of scales to which the first cursor is dedicated; the fundamental of this chord corresponds to the first part of the name of the chord; it is determined by the note indicated on said base, facing the first graduation 3 coinciding with the second graduation 5 of the first cursor B, facing which is the end part of the name of said four-note chord.

The end parts of the names of the four-note chords 20 are as follows:

for the major scale (FIGS. 3 and 6 to 9), the inscriptions 20 are:
- 7M to designate a major $7^{th}$ chord under degrees I, IV; and
- min 7 to designate a minor $7^{th}$ chord under degrees II, III, and VI;
- 7 to designate a $7^{th}$ chord;
- min 7/−5 for a minor $7^{th}$ and diminished $5^{th}$ chord under degree VII; and for the harmonic minor scale (FIG. 5), the inscriptions 20 are:
- min 7M to designate a major minor $7^{th}$ chord under degree I;
- min 7/−5 to designate a minor $7^{th}$ and diminished $5^{th}$ chord under degree II;
- min 7M/#5 to designate a major $7^{th}$ and augmented $5^{th}$ chord under degree III;
- min 7 to designate a minor $7^{th}$ chord under degree IV;
- 7 to designate a $7^{th}$ chord under degree V;
- 7M to designate a major $7^{th}$ chord under degree VI;
- 7dim to designate a diminished $7^{th}$ chord under degree VII;

for the ascending melodic minor scale (FIG. 10), the inscriptions 20 are:
- min 7M for a major minor $7^{th}$ chord under degree I;
- min 7 for a minor $7^{th}$ chord under degree II;
- 7M/#5 for a major $7^{th}$ and augmented $5^{th}$ chord under degree III;
- 7 for a minor $7^{th}$ chord under degrees IV and V;
- min 7/−5 for a minor $7^{th}$ and diminished $5^{th}$ chord under degrees VI and VII.

Figure 6:
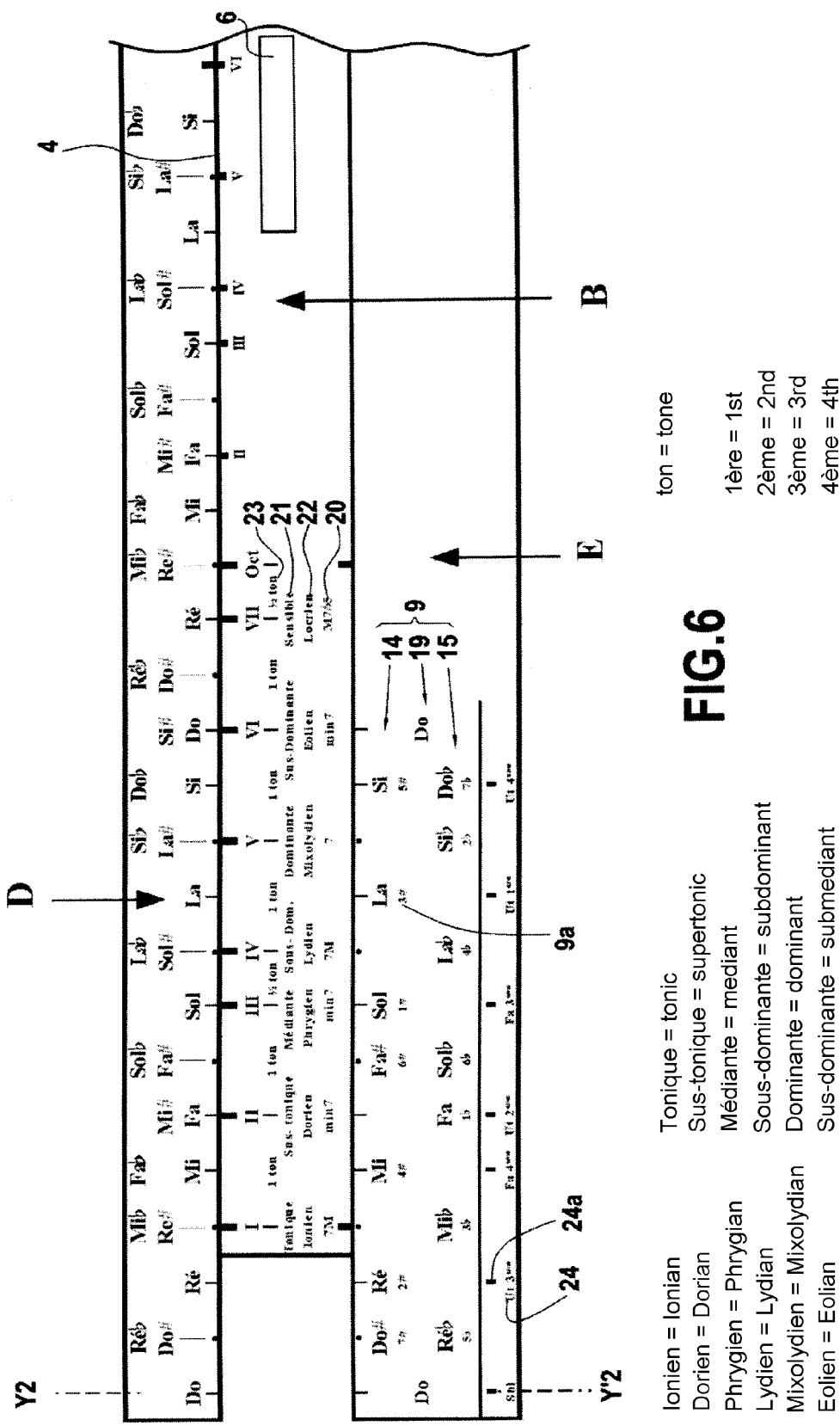
FIG. 6 shows the notes of the Re major scale selected by sliding the first cursor.

In FIGS. 3 and 6, for the major scales category, there are also marked on the first cursor B the names 22 of the modal functions of the notes written under the corresponding degrees, namely: Ionian under degree I, Dorian under degree II, Phrygian under degree III, Lydian under degree IV, Mixolydian under degree V, Eolian under degree VI, and Locrian under degree VII.

The names 22 of the modal functions are written under the names 21 of the tonal functions and above the end parts of the names 20 of the four-note chords.

In FIGS. 3 and 5 to 10, by way of illustration, the names 20, 21, 22, 23 referred to above are in French, but they could be translated into another language.

The lower part E of the base A comprises fourth graduations 13 vertically aligned with the first graduations 3 of the upper part D of the base. Vertically aligned below the fourth graduations 13 are inscribed at 9 the 15 tonalities of scales of the scale category given by the first cursor, the most usual ones according to the fundamental rules of harmony, i.e. the tonalities with the least modifications in the key signature and, where applicable, on the stave. The number and nature of the modifications of the tonalities of the scales concerned is indicated at 9a below the name of the tonality of the scale.

For each category of scales with 15 scale tonalities, this data 9, 9a is looped to show the harmonic cycles.

Figure 7:
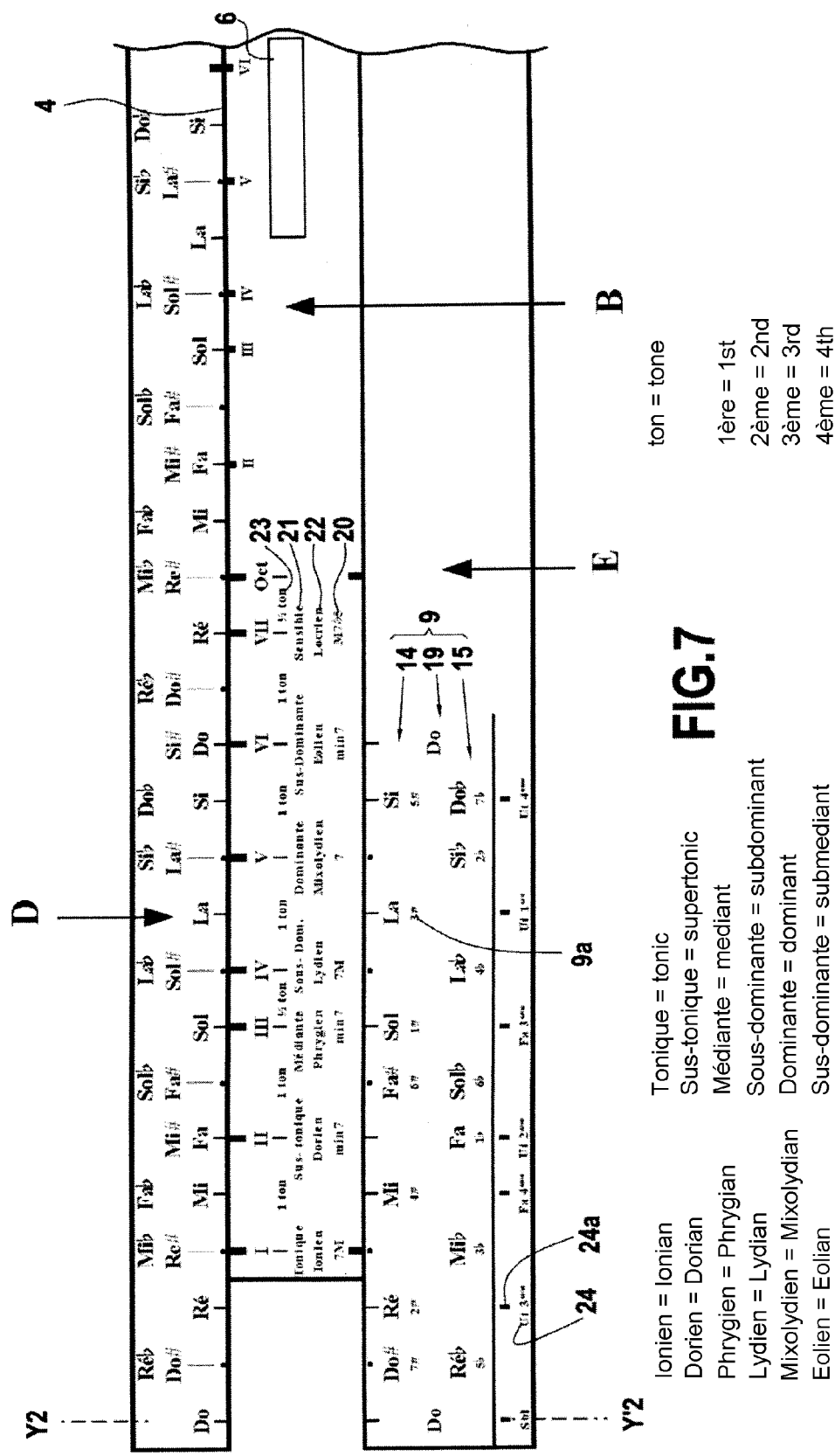
FIG. 7 shows the major scale of Mi♭.

Thus in FIGS. 3 and 6 to 7 for the lower part E of the base A designed to cooperate with a first major scale cursor B, the 15 scale tonalities are: Do, Do♯ and Re♭, Re, Mi♭ and Mi, Fa and Fa♯, Sol♭ and Sol, La♭ and La, Si♭ and Si, Do♭, and the means 9 for identifying the 15 scale tonalities are disposed as follows:

The key of Do is marked on an intermediate line 19 of the lower part E of the base A, aligned vertically below the note Do of the upper part D of the base A at the first and thirteenth first graduations 3 and fourth graduations 13.

An upper line 14 on the lower part E of the base A below the line 13 of fourth graduations is marked with the following successive tonalities: Do♯, Re, Mi, Fa♯, Sol, La, and Si, respectively opposite the second, third, fifth, seventh, eighth, tenth, and twelfth of said fourth graduations 13 of the lower part E and first graduations 3 of the upper part D of the base A, i.e. aligned vertically below the identical notes of the upper part D of the base A.

A lower line 15 carries the tonalities: Re♭, Mi♭, Fa, Sol♭, La♭, Si♭, and Do♭, respectively opposite the second, fourth, sixth, seventh, ninth, eleventh, and twelfth of said fourth graduations 13 and said first graduations 3.

The intermediate line 19 repeats the markings for the key of Do vertically aligned below the final fourth graduation $13_2$ so that the combination of the upper line 14, the intermediate line 19, and the lower line 15 forms a loop and shows a harmonic cycle.

For the minor scales devices of FIGS. 5 and 10, the upper line 14, intermediate line 19 and lower line 15 are marked with the 15 tonalities of the following minor scales identical for both minor scale categories.

The tonality of the scale of $La_m$ (La minor scale) opposite the first fourth graduation $13_1$ and last (thirteenth) fourth graduation $13_2$ on an intermediate line 19.

The $La\sharp_m$, $Si_m$, $Do\sharp_m$, $Re\sharp_m$, $Mi_m$, $Fa\sharp_m$, $Sol\sharp_m$ markings appear on an upper line 14 aligned vertically below said fourth graduations 13 and below the first graduation 3 corresponding to the identical notes of the upper part D of the base A, the following tonalities appearing on a lower line 15: $Si\flat_m$, $Do_m$, $Re_m$, $Mi\flat_m$, $Fa_m$, $Sol_m$, and $La\flat_m$.

Under the looped 15 scale tonalities there appear at 9a the number and nature of the sharp, flat or natural type modifications found in the key signature and on the stave in a score, for the category of scales concerned, as follows:

For the major scale (FIGS. 3 and 6 to 7), the markings 9a are as follows: 7♯ for the scale of key Do, for the scale of tonality Re, 4♯ for the scale of tonality Mi, 6♯ for the scale of tonality Fa♯, 1♯ for the scale of tonality Sol, 3♯ for the scale of tonality La, 5♯ for the scale of tonality Si, 5♭ for the scale of tonality Re♭, 3♭ for the scale of tonality Mi♭, 1♭ for the scale of tonality Fa, 6♭ for the scale of tonality Sol♭, 4♭ for the scale of tonality La♭, 2♭ for the scale of tonality Si♭, 7♭ for the scale of tonality Do♭.

For the harmonic minor scale (FIG. 5), the markings 9a are as follows: 7♯ in the key signature and 1x on the stave for the scale of tonality $La\sharp_m$, 2♯ in the key signature and 1♯ on the stave for the scale of tonality $Si_m$, 4♯ in the key signature and 1♯ on the stave for the scale of tonality $Do\sharp_m$, 6♯ in the tonality signature and 1x on the stave for the scale of tonality $Re\sharp_m$, 1♯ in the tonality signature and 1♯ on the stave for the scale of tonality $Mi_m$, 3♯ in the key signature and on the stave for the scale of tonality $Fa\sharp_m$, 5♯ in the key signature and 1x on the stave for the scale of tonality $Sol\sharp_m$, 1♯ on the stave for the scale of tonality $La_m$, 5♭ in the key signature and a natural on the stave for the scale of tonality $Si\flat_m$, 3♭ in the key signature and a natural on the stave for the scale of tonality $Do_m$, 1♭ in the key signature and 1♯ on the stave for the scale of tonality $Re_m$, 6♭ in the key signature and 1 natural on the stave for the scale of tonality $Mi\flat_m$, 4♭ in the key signature and a natural on the stave for the scale of tonality $Fa_m$, 2♭ in the key signature and 1♮ on the stave for the scale of tonality Sol$_m$, 7♭ in the key signature and a natural on the stave for the scale of tonality La♭$_m$.

For the ascending melodic minor scale (FIG. 10), the markings 9a are as follows: 7♯ in the key signature and 2x on the stave for the scale of tonality La♯$_m$, 2♯ in the key signature and 2♯♯ on the stave for the scale of tonality Si$_m$, 4♯ in the key signature and 2♯ on the stave for the scale of tonality Do♯$_m$, 6♯ in the key signature, 1♯ on the stave and 1x for the scale of tonality Re♯$_m$, 1♯ in the key signature and 2♯ on the stave for the scale of tonality Mi$_m$, 3♯ in the key signature and 2♯ on the stave for the scale of tonality Fa♯$_m$, 5♯ in the key signature, 1♯ and 1x on the stave for the scale of tonality Sol♯$_m$, zero modification in the key signature and 2♯ on the stave for the scale of tonality La$_m$, 5♭ in the key signature and 2 naturals on the stave for the scale of tonality Si♭$_m$, 3♭ in the key signature and 2 naturals on the stave for the scale of tonality Do$_m$, 1♭ in the key signature and 1 natural and 1♯ on the stave for the scale of tonality Re$_m$, 6♭ in the key signature and 2 naturals on the stave for the scale of tonality Mi♭$_m$, 4♭ in the key signature and 2 naturals on the stave for the scale of tonality Fa$_m$, and 2♭ in the key signature and 1 natural and 1♯ on the stave for the scale of tonality Sol$_m$, 5♯ in the key signature and 1x and 1♯ on the stave for the Sol♯$_m$ scale, and 7♭ in the tonality signature and 1 natural on the stave for the La♭$_m$ scale.

Finally, in FIGS. 3 and 5 to 10, the lower part E of the base A has a lower line 25 just above its lower edge 27 carrying the indications 24 of the various reading clefs. A first inscription on the left designates the note Sol for the clef of Sol, vertically aligned under the note Do written on the intermediate line 19 of the lower part E and under the corresponding note Do of the upper part D of the base A. The indications 24 of the other reading clefs comprise the successive inscriptions 25 aligned horizontally: Ut $3^{rd}$, Fa $4^{th}$, Ut $2^{nd}$, Fa $3^{rd}$, Ut $1^{st}$, and Ut $4^{th}$. These inscriptions 24 are aligned vertically with fifth graduations 24a themselves aligned vertically below the respective successive notes: Re, Mi, Fa, Sol, La, and Si of the lower parts E of the base A.

Thus the lower part E of the base A includes information relating to the harmonic cycles and to the clefs with, from the bottom upwards:
- a line of fourth graduations 13 representing the intervals of the octave on the lower edge of the groove 12;
- a line 14 representing the names of the tonalities of scales comprising sharps in the key signature;
- a line 9a designating the number and nature of the sharps in the key signature and where appropriate the number and nature of the modifications on the stave;
- a line 19 designating twice the natural scale with no modifications;
- a line 15 designating the name of tonalities of scale including flats;
- a line 9a designating the number and the nature of the flats in the key signature and where appropriate the number of modifications on the stave;
- a line 25 designating the names of the reading clefs 24.

In the English-speaking system, the "Ut" is not distinguished from "Do" and is transcribed as C.

FIG. 4 shows the second cursor C. The second cursor C includes, halfway up, a median line 11 in the longitudinal direction XX'.

Starting from this median line are vertical segments 27 whose intersections with the median line form said successive third graduations 10 that are spaced by a semitone and of which there are therefore 25 for a device representing the intervals over two octaves.

At the end of these successive vertical segments 27 are horizontal inscriptions 28, 28-1 to 28-5 corresponding to the names of notes relative to the length of the corresponding interval of said third graduation 10 relative to the first of said third graduations $10_1$ when said third graduation is assigned to a fundamental note and also relative to the number of notes included in the interval of said third graduation 10 in question.

To be more precise, the successive vertical segments 27 have at their end the following names situated on either side of said line, namely:
- the names of the thirds comprising, from left to right, the minor $3^{rd}$ and the major $3^{rd}$, the fifths comprising a diminished $5^{th}$, a perfect $5^{th}$ and an augmented $5^{th}$, and the $7^{ths}$, comprising a diminished $7^{th}$, a minor $7^{th}$, and a major $7^{th}$, with different colors for the thirds, fifths, and $7^{ths}$, situated on the same upper side of said median line 11 of said corresponding third graduations, repeated over two octaves, with in addition for the second octave the names of the $10^{ths}$ comprising the minor $10^{th}$ and major $10^{th}$; and
- the names of the seconds comprising, from left to right, the minor $2^{nd}$ ("$2^e$min" in the figure), major $2^{nd}$, and augmented $2^{nd}$, the fourths comprising the diminished $4^{th}$, perfect $4^{ths}$ and augmented $4^{th}$, the sixths comprising the minor $6^{th}$ and major $6^{th}$, repeated over two octaves, the $9^{ths}$ comprising the minor $9^{th}$, major $9^{th}$, and augmented $9^{th}$, the $11^{ths}$ comprising the diminished $11^{th}$, the perfect $11^{th}$, and the augmented $11^{th}$, and the $13^{ths}$, comprising the minor $13^{th}$ and major $13^{th}$, facing said corresponding third graduations for the second octave, disposed on the other side of said line of third graduations, with different colors from those of the names of the thirds, fifths, and $7^{ths}$.

The names on the upper side of said median line are on the upper part C1 of said second cursor projecting beyond said base.

The second cursor also includes vertical lines Y3Y'3, Y4Y'4, Y5Y'5 in corresponding relationship with the first third graduation $10_1$, the thirteenth third graduation $10_2$, and the twenty-fifth third graduation $10_3$, respectively.

The right-hand part 17 of the second cursor C between the axes Y4Y'4 and Y5Y'5 comprises:
- above the median line 11, facing the successive third graduations 10 of the two octaves, the following corresponding markings 18b: minor $10^{th}$ or $3^{rd}$, major $10^{th}$ or $3^{rd}$, diminished $5^{th}$, perfect $5^{th}$, augmented $5^{th}$, diminished $7^{th}$, minor $7^{th}$, and major $7^{th}$; and
- below the median line 11, facing the successive third graduations 10 of the second octave, the names 18b: minor $9^{th}$ or $2^{nd}$ ("$9^e$ or $2^e$ min" in the figure), major $9^{th}$ or $2^{nd}$, augmented $9^{th}$ or $2^{nd}$, diminished $11^{th}$ or $4^{th}$, perfect $11^{th}$ or $4^{th}$, augmented $11^{th}$ or $4^{th}$, minor $13^{th}$ or $6^{th}$ and major $13^{th}$ or $6^{th}$.

The markings 28, 28-1 to 28-5 and 18a and 18b in FIG. 4 and described above correspond to names in French but could be translated into other languages. Thus in FIG. 4 the second cursor C carries information relating to the intervals of the octave and to the formation of chords with:
- the names of the successive intervals of the octave in the left-hand part 16 duplicated in the right-hand part 17;
- the second cursor C being transparent, it further enables reading of the information on the surfaces of the base A and the first cursor B.

Moreover, a different color being assigned to the names of the intervals, for example blue for thirds, red for seconds, green for fourths, brown for fifths, violet for sixths, and black for $7^{ths}$, this enables them to be discerned more clearly.

The median line 11 of the second cursor C coincides with the line 4, 4a, 4b of the base A and the first cursor B when the second cursor C is disposed over the base A and the first cursor B.

As mentioned above, the second cursor C includes an upper part C1 extending beyond the upper part D of the base A and carrying the names of the thirds, fifths, sevenths appearing above the median line 11 of the second cursor C to facilitate reading in that no name appears below.

The organization of the data on the device 1 enables it to function as follows:

In FIG. 3, which shows a device dedicated to the major scales, if the first cursor B is aligned vertically with the degree I under the first graduation 3 of the note Do of the upper part D of the base A, the note Sol of the upper part D of the base A is associated vertically with the degree V of the scale of Do major and in the tonality system the note Sol generates a dominant seventh chord.

Similarly, in the modal system, the note Sol is the first note of the Sol Myxolidian mode, generating a seventh chord, or the second note of the Fa Lydian mode.

All the tonalities of the scale may be generated successively by sliding the first cursor B semitone by semitone.

The modified scales comprising sharps are read off in consecutive order on the line 2a of natural notes or on the line 2b2 of sharpened notes, according to the alignment of the first graduations 3 and the second graduations 5 of the horizontal axis 4. The modified scales comprising flats are read off in consecutive order on the line 2a of natural notes or on the line 2b1 of flattened notes, according to the alignment of the first graduations 3 and the second graduations 5 on the horizontal axis 4.

For example, the Re major scale is obtained (see FIG. 6) by aligning the first of the second graduations 5 corresponding to the degree I of the first cursor B with said first graduation 3 corresponding to the note Re on the upper part D. The successive notes of the Re major scale are read off the upper part D according to the consecutive order of the notes of the scale, namely Re, Mi, Fa♯, Sol, La, Si, and Do♯.

Note that the Re major scale has two sharps in the key signature as indicated on the lower part E below the tonality Re.

Note also that the note Sol, which is degree V of the Do major scale, is also degree IV of the Re major scale, generating a Sol major seventh chord in the Re major scale.

The major scales generate in degree VI the relative minor scales. Simply aligning degree I on the second cursor with the first graduation 3 and the note of the upper part D of the base A corresponding to degree VI of the major scale generates its relative minor natural scale.

Thus FIG. 7 shows that the Mi♭ flat major scale has Do for degree VI.

Do is thus the tonic of the Do minor natural scale relative to the Mi♭ major scale and, like said scale, has three flats in the key signature, as indicated in the lower part E of the base A below the tonality Mi♭ on the lower line 15.

Thus the FIG. 3 device 1 covers the 15 tonalities of the major scale and their seven modes as well as the 15 tonalities of their relative minor natural scale.

This use is valid for all the reading clefs.

By cooperation of the upper part D of the base and the first cursor B it is possible to find chord sequences after transposition from one scale to another.

In FIG. 4 it is seen that the second cursor C makes it possible to read intervals, duplicated intervals and their inversions and thus to read consecutive notes of all the chords. Inversion of intervals consists in inverting the respective position of two notes so that the low note of the interval to be inverted becomes the high note of the inversion.

For chord inversions, starting from a chord consisting for example of the fundamental note (the third and the fifth), a distinction is established by double cyclic permutation between the chord of the first inversion consisting of the third/the fifth/the fundamental note of the next octave and that of the second inversion consisting of the fifth/the fundamental note of the next octave/the third of the next octave.

It is thus seen that, as shown in FIG. 4, the second cursor facilitates constructing inverted chords from a base chord.

Figure 8:
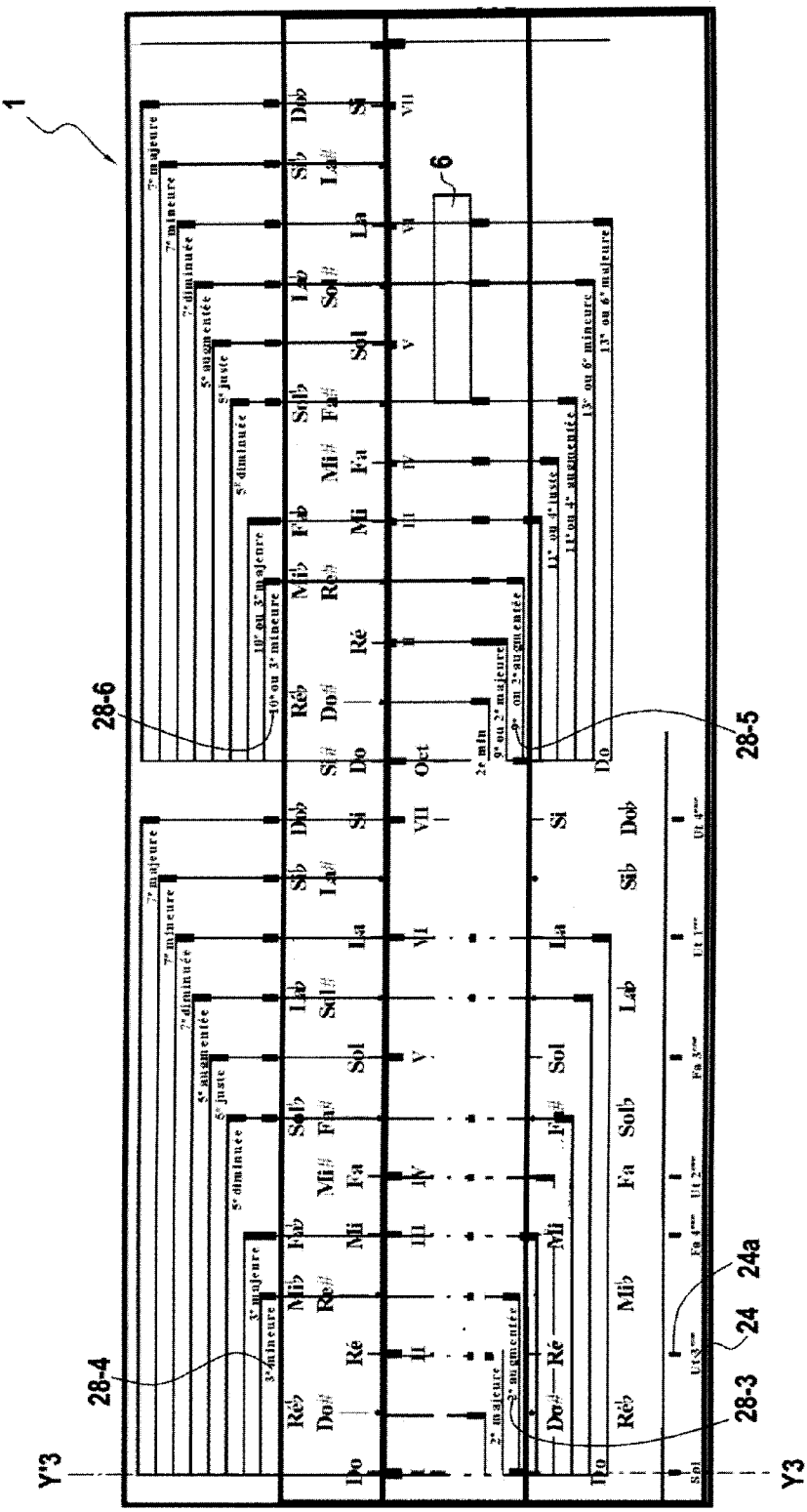
FIG. 8 shows an alignment of the first fourth graduation 13 of the second cursor C with the note Do of the major scale.
Figure 9:
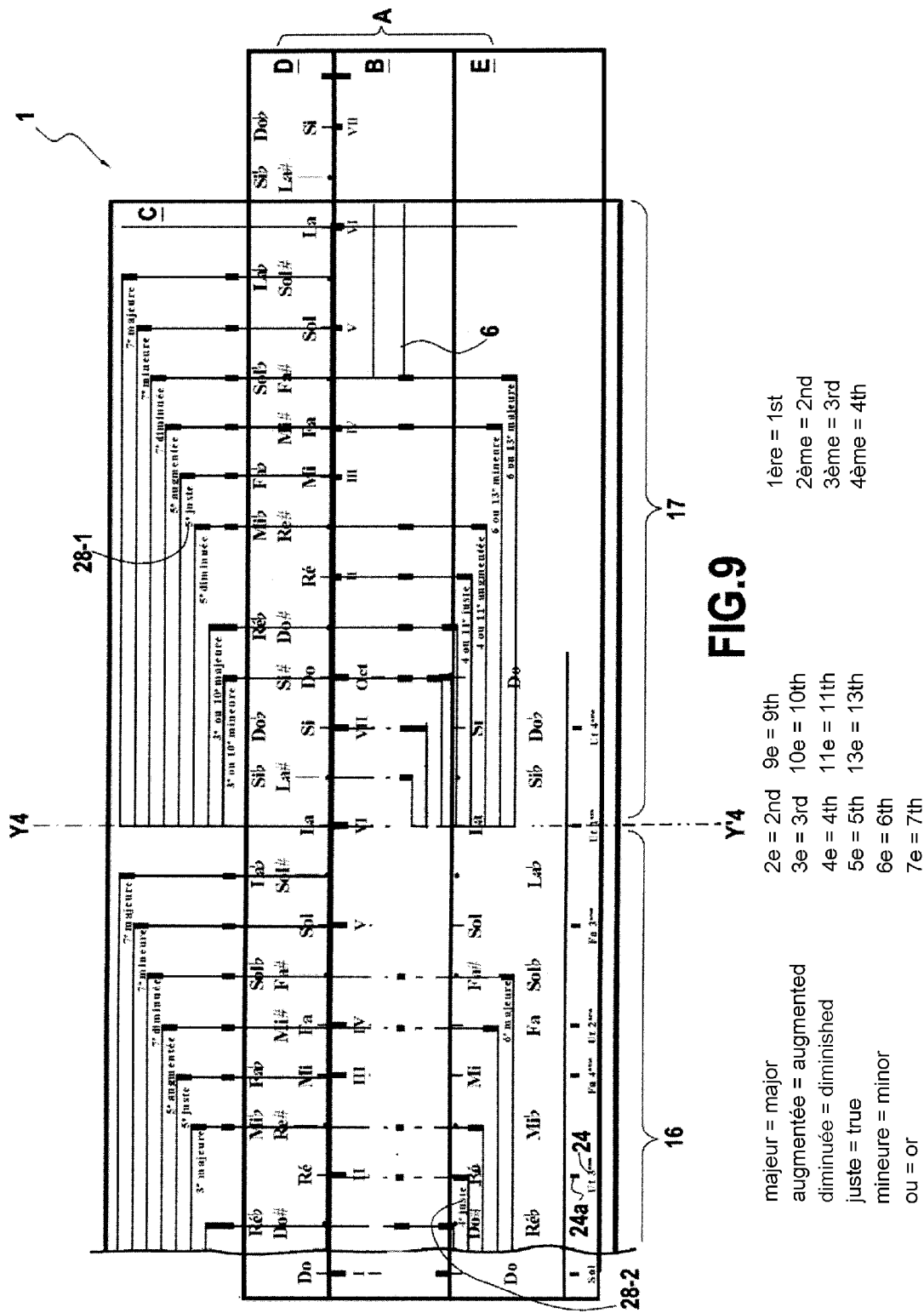
FIG. 9 shows the alignment of the median vertical axis $Y_4Y'_4$ of the second cursor with the 13$^{th}$ fourth graduation 13 for the note La.

By superposing with the first third graduation $10_1$ or the axis Y3Y'3 a fundamental note from the upper part D of the base A, this organization of the data makes it possible to read in a differentiated manner chromatic and/or diatonic intervals, as shown in FIGS. 8 and 9.

To make FIGS. 8 and 9 easier to read, given that some inscriptions on different parts of the device are superposed, some names or markings 20 to 23 and some markings 28 in the parts 16 and 17 below the median line 11 are not shown, notably where some inscriptions or names on the various parts of the device overlap.

By aligning the vertical axis Y3Y'3 passing through the first third graduation $10_1$ on the note Do of the upper part of the base, as shown in FIG. 8, the device enables differentiated reading in the left-hand part 16 of the second cursor of an interval of three semitones that may be, as appropriate, between Do and Re♯, an augmented second 28-3 ("$2^{ème}$ augmentée" in FIG. 8) i.e. one tone and one chromatic semitone or between Do and Mi♭, a minor third 28-4 ("$3^{ème}$ mineure" in FIG. 8), i.e. three diatonic semitones. For the double interval Do, Re♭, there is read off at 28-5 on the right-hand part 17, corresponding to the second octave, the augmented $9^{th}$ or $2^{nd}$ or, for the doubled interval, Do, Mi♭, there is read off at 28-6 on the right-hand part 17 a minor $10^{th}$ or $3^{rd}$.

In FIG. 9, the vertical median axis Y4Y'4 of the second cursor C is superposed on the note La of the upper part of the base A. By reading in the part 17 (second octave), it is seen at 28-1 that the note La has Mi for the perfect fifth ("$5^{ème}$ juste" in FIG. 9) and in the part 16 (first octave), it is seen at 28-2 that the inversion of the note Mi conforms to a perfect fourth ("$4^{ème}$ juste" in FIGS. 4 and 9).

The chords being formed by successive thirds from a fundamental note, the organization of the intervals relative to the horizontal axis 11 makes it possible to form and to read off all the chords.

By simply aligning the various third graduations 10 of the second cursor on the various notes of the upper part of the base it is possible to determine all possible chords.

Conversely, starting from a series of notes, the second cursor makes it possible to find the name of the chord. For example, the name of the chord that the notes Re, Fa♯, La, Do♯ constitute is obtained in the following manner. The first third graduation $10'_1$ is aligned on the vertical axis Y3Y'3 of the second cursor over the note Re of the upper part of the base A, which corresponds to the fundamental of the chord. Reading off here shows that the note Fa♯ corresponds to a major third ("$3^{ème}$ majeure" in FIGS. 4 and 9), the note La has a perfect fifth ("$5^{ème}$ juste" in FIGS. 4 and 9), and the note Do♯ has a major seventh. Thus the chord is called Re major $7^{th}$, which incidentally is indicated on the last line of the cursor under the note Re.

Conversely, it is possible to read the consecutive notes of a chord knowing its name or its intervals. For example, the Sol dominant $9^{th}$ chord is made up of a major third, a perfect fifth, a minor seventh and a major ninth. Positioning the vertical axis Y3Y'3 of the second cursor on the note Sol of the upper part of the base A the constituent notes of the chord are simply read off the second cursor, namely Sol, Si, Re, Fa, and La.

In the same way as for all chords in the fundamental state, all the chord inversions may be constructed and/or named using the device.

The device of the invention also enables transposition of scales. For example, for a Lab major scale, its lower natural fourth transposition may be determined in the following manner. The third graduation 10 corresponding to the perfect 4$^{th}$ on the second cursor is placed opposite the note Lab of the upper part D of the base A and there is read off against the vertical axis Y3Y'3 or the first third graduation 10$_1$ of the second cursor the note Mi♭ in the harmonic cycle of the lower part E of the base A.

The transposed scale may be generated by aligning the degree I of the first cursor B on the note Mi♭ of the base.

For transposing instruments or instruments that do not use the tonality of Sol, the device enables tonality transposition as follows. The note Do in the upper part D of the base is considered as Do of the tonality of Sol. Being aligned under Do, the reading clef Sol is given by the lower part E. The reading clef of a transposing instrument in Fa is given by vertical alignment on Fa on the upper part D and its reading clef is Ut 2$^{nd}$ (Ut 2$^{ème}$) as indicated on the lower part E of the base A.

For an instrument that transposes a minor second lower than the Do of the tonality of Sol, aligning the axis Y3Y'3 or Y4Y'4 of the second cursor C on the note Do on the base, the minor second inversion gives the note of the transposing instrument, which is Si♭, the name of the reference note is Si whereas on the lower part E there is given the reading clef that is aligned on the Ut 4$^{th}$ (Ut 4$^{ème}$) graduation and vice-versa.

In the same manner, an instrument that transposes a major second higher than the Fa 3$^{rd}$ clef gives a reading clef Ut 1$^{st}$ (Ut 1$^{ère}$).

The device of the invention thus enables transposition of all scales and all tonalities.

In FIG. 5, a device of the invention for harmonic minor scales functions in exactly the same manner as the device for major scales.

Accordingly, the harmonic minor Re♯ scale is obtained by aligning degree I or Oct of the first cursor B with the tonality Re♯$_m$ on the lower part E of the base.

The lower part E of the base indicates that the scale of Re♯$_m$ has 6♯ in the key signature and an x on the stave. The notes of the harmonic minor Re♯ scale are read off the upper part D according to the consecutive order of the notes of the scale given by the first cursor B, namely: Re♯, Mi♯, Fa♯, Sol♯, La♯, Si, and Dox.

By aligning the vertical axis Y3Y'3 of the second cursor on the degree III of the harmonic minor Re♯ scale, i.e. with the first cursor B, showing its degree I, opposite Re♯ on the upper part of the base, the second cursor C makes it possible to read off on the upper part A a note consisting of the notes Fa♯, La♯, Dox and Mi♯.

This is a Fa♯ major 7$^{th}$ chord with augmented fifth. All the functions linked to the degrees may also be read and vice-versa.

To transpose a tonality of Mi major by a descending minor third, the second cursor is aligned so that the tonic Mi is aligned on the third graduation corresponding to a minor third and the notes Do♯ and Re♭ are read off the base against the first third graduation, namely Y3Y'3.

To the extent that the transposition required is a descending minor third, the interval must contain three notes, i.e. the Do♯ and not the Re♭. The tonality of Re♭ would correspond to an interval of an augmented second.

To find the fourth of the degree II chord of the Re major scale in order to augment it by a given interval, the two cursors must cooperate in the following manner.

The first cursor B is placed with the degree I vertically aligned with the note Re on the base. There is read off under the degree II the name of the four-note chord on the first cursor and the complete name with the second cursor and the base, namely Mi minor 7$^{th}$ 9$^{th}$ major. Placing the axis Y3Y'3 of the second cursor on the note Mi on the base shows that its fourth is La and thus that the fourth of the chord Mi is La.

The fourth of the chord of the second degree II of the Re major scale is augmented by a given interval as follows. The first cursor is slid into vertical alignment with the second graduation 5 of the first cursor B on the note Re of the base and the degree II of this scale is read off, namely Mi. The second cursor C is then slid to align the first third graduation and the axis Y3Y-3 of the cursor C with the note Mi on the base. The fourth is then obtained by reading off the note of the base whose first graduation 3 is vertically aligned with the third graduation 10 of the second cursor associated with the "perfect fourth" note name, namely the note La. Finally, the note corresponding to the augmented fourth of the given scale is read off, namely La♯.

To augment by a semitone the fourth of the chord of the third degree of the Re major scale, the first of the second graduations of the first cursor B is aligned with the note Re. The degree III of this scale is read off from the base, namely Fa♯. The axis Y3Y'3 of the second cursor C is then aligned on Fa♯ and the fourth is obtained by reading off the note on the base associated with the first graduation aligned with the third graduation 10 associated with "fourth" ("quarte") on the second cursor, namely the note Si. Its fourth augmented by a semitone is Si♯.

The above examples show that the device of the invention, by sliding the cursors and reading the various graduations, makes it possible to obtain data for all reading clefs, all intervals and their inversions and a scale, a chord or a given note and all chords, all diatonic scales, all their tonalities, all their modes, all transpositions of scales or tonalities, in an analytical manner and in accordance with the fundamental rules of harmony.

The specific combination of the cursors of the devices and the information carried on the components of the device make it possible to provide true and coherent harmonic musical data by aligning graduations relating to the four fundamental aspects, which are note, tonality, scale and nature and number of modifications, from which fundamental aspects in combination with data relating to transpositions, tonalities and intervals flow chords and modes.

Furthermore, the specific combination of the cursors of the device and the information that they carry enable the use of double sharps and double flats, thus making it possible to represent exhaustively all heptatonic scales and derived scales.

The invention claimed is:

1. A device (1) for providing and analyzing musical data, comprising:
   a rectangular support element called base (A) on which musical data are marked, in particular written; and
   two rectangular sliding elements called cursors (B, C) able to slide longitudinally (XX') relative to said rectangular base on which complementary musical data are marked, in particular written;
   the device being characterized in that it comprises at least:
   a) a rectangular base (A) on which are marked:
      first graduations (3) aligned in said longitudinal direction of the base, said first graduations (3) being spaced at equal intervals of length that correspond to a frequency difference of one semitone and defining at least 24 intervals of one semitone; and musical data consisting in the seven names of the seven natural notes (2a) of a heptatonic scale and the 14 names of sharpened and flattened notes (2b, 2b$_1$-2b$_2$) disposed in said longitudinal direction of the base in order of increasing frequency, repeated over at least two octaves, disposed near, and preferably aligned vertically with, said first graduations (3); and b) said two cursors (B, C) adapted to slide independently of each other longitudinally (XX') relative to said rectangular base:

b1) a first cursor of said two cursors on which are marked:

at least second graduations (5) aligned in said longitudinal direction, successively spaced at an interval of length that corresponds to a multiple of one semitone, according to the intervals of the notes of a given category of scales (6, 7, 8), defining at least 14 intervals; and the successive degrees of the successive notes of a said given category of scales, preferably in the form of the numbers I to VII for the first octave of the scale and preferably with a symbol, such as "Oct", marking the passage to the next octave and then the numbers II to VII for the successive degrees of the next octave, disposed facing said successive second graduations (5); and b2) a second cursor (C) of said two cursors on which are marked third graduations (10) disposed along a line (11) in the longitudinal direction (XX'), said third graduations (10) being spaced at equal distances corresponding to one semitone over at least two octaves, with the writing of the names of the second, third, fourth, fifth, sixth, and seventh intervals at least at the level of said third graduations of the first octave, and preferably also the ninth, eleventh and thirteenth intervals at least at the level of said third graduations of the second octave, namely and preferably at least names identifying the minor 2$^{nd}$, major 2$^{nd}$, augmented 2$^{nd}$, minor 3$^{rd}$, major 3$^{rd}$, diminished 4$^{th}$, perfect 4$^{th}$, augmented 4$^{th}$, diminished 5$^{th}$, perfect 5$^{th}$, augmented 5$^{th}$, minor 6$^{th}$, major 6$^{th}$, diminished 7$^{th}$, minor 7$^{th}$, major 7$^{th}$ at the level at least of said third graduations of the first octave, and preferably the minor 9$^{th}$, major 9$^{th}$, augmented 9$^{th}$, minor 10$^{th}$, major 10$^{th}$, diminished 11$^{th}$, perfect 11$^{th}$, augmented 11$^{th}$, minor 13$^{th}$, and major 13$^{th}$ at the level of said third graduations of the second octave.

2. A device according to claim 1, characterized in that said base (A) further includes identification marks (9) for identifying the 15 tonalities of scales comprising the fewest modifications of the sharp and flat types in the key signature and not simultaneously comprising sharps and flats for said concerned category of scales.

3. A device according to claim 2, characterized in that:

said identification marks (9) for identifying said 15 tonalities of scales on said base including the fewest said modifications, comprise the writing of said tonalities of scales, namely:

for the major scale: Do, Do♯, Re♭, Re, Mi♭, Mi, Fa, Fa♯, Sol♭, Sol, La♭, La, Si♭, Si, Do♭; and for the minor scales: La$_m$, La♯$_m$, Si♭$_m$, Si$_m$, Do$_m$, Do♯$_m$, Re$_m$, Re♯$_m$, Mi♭$_m$, Mi$_m$, Fa$_m$, Fa♯$_m$, Sol$_m$ Sol♯$_m$ and La♭$_m$; and said base (A) includes a groove (12) in which said first cursor (B) is adapted to slide and said base is divided between:

an upper part (D) situated above said groove comprising said first graduations (3) and said names of the natural notes (2a) and said modified notes (2b) disposed above said first graduations (3); and a lower part (E) comprising:

fourth graduations (13) vertically aligned with said first graduations (3) of the upper part; and the names of said 15 tonalities of scales including the fewest said modifications for said given category of scales of said first cursor;

said names of said 15 tonalities being disposed as follows:

the names of the tonalities are aligned vertically with the identical notes of said upper part;

the names of the tonalities comprising sharps are aligned on an upper line (14) in the longitudinal direction;

the names of the tonalities comprising flats are aligned on a lower line (15) in the longitudinal direction; and the name of the key without modifications in the key signature is disposed twice on an intermediate line (19), offset longitudinally outside the upper and lower lines and repeated at each end.

4. A device according to claim 3, characterized in that, under each of said 15 tonalities of scales, there are written the number and nature (9a) of the sharp, flat or natural type modifications found in the key signature and on the stave in a score for the scale concerned.

5. A device according to claim 1, characterized in that:

said first cursor (B) slides in a groove (12) of said base (A) so that the upper face of said base carrying said musical data markings comprising said first graduations (3) and said note names (2a, 2b) and the upper face of said first cursor (B) comprising the markings of said second graduations (5) are coplanar and said first cursor (B) preferably being disposed relative to said base (A) in such a manner that the line (4, 4b) defining said second graduations (5) and the line (4, 4a) defining said first graduations (3) of notes marked on said base define the longitudinal edges of said grooves and first cursor so that, where applicable, at least one of said first graduations can be vertically aligned with one of said second graduations, preferably on either side of a common definition line (4), by sliding said first cursor in said longitudinal direction; and said second cursor (C) is transparent and slides above the upper faces of the combination of said base (A) and said first cursor (B) with said line (11) that defines said third graduations (10) coinciding with the line (4) that defines said first graduations (3) of said base of said first cursor.

6. A device according to claim 1, characterized in that the names of the natural, sharpened and flattened notes are disposed on said base with:

an upper line comprising the flattened notes (2b$_1$);

an intermediate line comprising the sharpened notes (2b$_2$) vertically aligned below the corresponding flattened notes; and a lower line comprising the natural notes (2a);

said natural and modified notes being aligned vertically with said first graduations and two sharpened and flattened notes with different names intercalated between two successive natural notes spaced by one tone being vertically aligned with the same first graduation.

7. A device according to claim 1, characterized in that on said base there are further written the names of at least some of the double-sharpened notes disposed on the same line in said longitudinal direction as the sharpened notes.

8. A device according to claim 1, characterized in that said first cursor (B) comprises at least one of the following additional musical data in written form facing said second graduations and said names of degrees disposed on different lines in the longitudinal direction and superposed:

the end part of the name of the four-note chords (20) of said given category of scales of said first cursor, the fundamental of which chord corresponds to the first part of the name of the chord, is determined by the note indicated on said base against said first graduation coinciding with said second graduation of said first cursor facing the said end part of the name of said chord;

the names of the tonal functions of the various degrees (21);

the names of the modal functions of the various degrees (22); and the size of the interval (23), namely one tone, one semitone or three semitones, between the names of the successive degrees I to VII according to the category of scales concerned.

9. A device according to claim 1, characterized in that said second cursor (C) comprises a median line (11) in the longitudinal direction carrying said third graduations (10) and the following names situated on either side of said line, namely:

the names of the thirds comprising, the minor $3^{rd}$ and the major $3^{rd}$, the fifths comprising a diminished $5^{th}$, a perfect $5^{th}$ and an augmented $5^{th}$, and the $7^{ths}$, comprising a diminished $7^{th}$, a minor $7^{th}$, and a major $7^{th}$, with different colors for the thirds, fifths, and $7^{ths}$ situated on the same side of said median line (11) of said corresponding third graduations, preferably the upper side, preferably repeated over two octaves, with preferably in addition for the second octave the names of the $10^{ths}$ comprising the minor $10^{th}$ and major $10^{th}$; and the names of the seconds comprising, the minor $2^{nd}$, major $2^{nd}$, and augmented $2^{nd}$, the fourths comprising the diminished $4^{th}$, perfect $4^{th}$ and augmented $4^{th}$, the sixths comprising the minor $6^{th}$ and major $6^{th}$, preferably repeated over two octaves, the 9 ths, comprising the minor $9^{th}$, major $9^{th}$, and augmented $9^{th}$, the $11^{ths}$ comprising the diminished $11^{th}$, the perfect $11^{th}$, and the augmented $11^{th}$, and of the $13^{ths}$, comprising the minor $13^{th}$ and major $13^{th}$, facing said corresponding third graduations for the second octave, disposed on the other side of said line of third graduations, with different colors from those of the names of the thirds, fifths, and $7^{ths}$; and the names preferably situated on the upper side of said median line, being written on the upper part (C1) of said second cursor projecting beyond said base.

10. A device according to claim 1, characterized in that said base comprises, preferably in its lower part, fifth graduations (24a) with indications of reading clefs (24) comprising a written designation of the clef of Sol aligned vertically with the note Do written on the base and indications of the reading clefs (24) Ut $3^{rd}$, Fa $4^{th}$, Ut $2^{nd}$, Fa $3^{rd}$, Ut $1^{st}$, and Ut $4^{th}$ disposed successively, aligned (25) in said longitudinal direction and each aligned vertically with some of said first graduations and where appropriate said fourth graduations of the base, respectively corresponding at least to the following notes: Re for Ut $3^{rd}$, Mi for Fa $4^{th}$, Fa for Ut $2^{nd}$, Sol for Fa $3^{rd}$, La for Ut $1^{st}$, and Si for Ut $4^{th}$.

\* \* \* \* \*